(12) United States Patent
Weiss et al.

(10) Patent No.: US 11,408,814 B2
(45) Date of Patent: Aug. 9, 2022

(54) APPARATUS AND METHODS FOR HIGH THROUGHPUT THREE-DIMENSIONAL IMAGING

(71) Applicant: TECHNION RESEARCH & DEVELOPMENT FOUNDATION LIMITED, Haifa (IL)

(72) Inventors: Lucien Everett Weiss, Haifa (IL); Yoav Shechtman, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 16/981,852

(22) PCT Filed: Mar. 18, 2019

(86) PCT No.: PCT/IL2019/050300
§ 371 (c)(1),
(2) Date: Sep. 17, 2020

(87) PCT Pub. No.: WO2019/180705
PCT Pub. Date: Sep. 26, 2019

(65) Prior Publication Data
US 2021/0096056 A1    Apr. 1, 2021

Related U.S. Application Data

(60) Provisional application No. 62/644,513, filed on Mar. 18, 2018.

(51) Int. Cl.
*G06T 7/80* (2017.01)
*G01N 15/14* (2006.01)
(Continued)

(52) U.S. Cl.
CPC ....... *G01N 15/1434* (2013.01); *G01N 15/147* (2013.01); *G01N 15/1475* (2013.01);
(Continued)

(58) Field of Classification Search
None
See application file for complete search history.

(56) References Cited

U.S. PATENT DOCUMENTS

| | | | |
|---|---|---|---|
| 2003/0142289 A1* | 7/2003 | Ortyn | G06T 7/20 356/28 |
| 2007/0146873 A1* | 6/2007 | Ortyn | G02B 27/0075 359/386 |

(Continued)

OTHER PUBLICATIONS

Moldavan A. Photo-Electric Technique for the Counting of Microscopical Cells. Science. Aug. 24, 1934;80(2069):188-9. doi: 10.1126/science.80.2069.188. PMID: 17817054.

(Continued)

*Primary Examiner* — Eileen M Adams
(74) *Attorney, Agent, or Firm* — The Roy Gross Law Firm, LLC; Roy Gross

(57) ABSTRACT

An imaging system (200) including a phase-modulating element (202) configured and arranged with optics (100) in an imaging path (300) of the imaging system, to modulate light emitted from an object (150), while the object is in motion with respect to the imaging system, to create a modified point-spread function (PSF); and a processor (700) configured and arranged to generate, on an image plane (500) of the imaging system, a three-dimensional image from the modulated light to provide depth-based characteristics of the object. Other applications are also described.

16 Claims, 18 Drawing Sheets
(17 of 18 Drawing Sheet(s) Filed in Color)

(51) Int. Cl.
  *G06T 7/50* (2017.01)
  *G06T 7/70* (2017.01)
  *G01N 15/10* (2006.01)

(52) U.S. Cl.
  CPC ............... *G06T 7/50* (2017.01); *G06T 7/70* (2017.01); *G06T 7/80* (2017.01); *G01N 2015/1006* (2013.01); *G01N 2015/1445* (2013.01); *G06T 2207/10056* (2013.01)

(56) References Cited

U.S. PATENT DOCUMENTS

| | | | | |
|---|---|---|---|---|
| 2010/0165134 | A1* | 7/2010 | Dowski, Jr. | G02B 3/0025 348/218.1 |
| 2013/0147925 | A1 | 6/2013 | Lew et al. | |
| 2014/0226881 | A1 | 8/2014 | Piestun et al. | |
| 2016/0062100 | A1 | 3/2016 | Cohen et al. | |
| 2016/0125610 | A1* | 5/2016 | Piestun | H04N 13/204 348/46 |
| 2016/0231553 | A1 | 8/2016 | Piestun et al. | |
| 2016/0301914 | A1* | 10/2016 | Shechtman | H04N 13/214 |
| 2016/0301915 | A1 | 10/2016 | Shechtman et al. | |

OTHER PUBLICATIONS

Kamentsky LA, Melamed MR, Derman H. Spectrophotometer: new instrument for ultrarapid cell analysis. Science. Oct. 29, 1965;150(3696):630-1. doi: 10.1126/science.150.3696.630. PMID: 5837105.
Kay DB, Wheeless LL Jr. Laser stroboscopic photography. Technique for cell orientation studies in flow. J Histochem Cytochem. Jan. 1976;24(1):265-8. doi: 10.1177/24.1.768371. PMID: 768371.
Kay, D. B., Cambier, J. L., & Wheeless, L. L. (1979). Imaging in flow. Journal of Histochemistry & Cytochemistry, 27(1), 329-334. https://doi.org/10.1177/27.1.374597.
Cambier JL, Kay DB, Wheeless LL Jr. A multidimensional slit-scan flow system. J Histochem Cytochem. Jan. 1979;27(1):321-4. doi: 10.1177/27.1.374595. PMID: 374595.
George TC, Basiji DA, Hall BE, Lynch DH, Ortyn WE, Perry DJ, Seo MJ, Zimmerman CA, Morrissey PJ. Distinguishing modes of cell death using the ImageStream multispectral imaging flow cytometer. Cytometry A. Jun. 2004;59(2):237-45. doi: 10.1002/cyto.a.20048. PMID: 15170603.
Basiji DA, Ortyn WE, Liang L, Venkatachalam V, Morrissey P. Cellular image analysis and imaging by flow cytometry. Clin Lab Med. Sep. 2007;27(3):653-70, viii. doi: 10.1016/j.cll.2007.05.008. PMID: 17658411; PMCID: PMC2034394.
Huang B, Wang W, Bates M, Zhuang X. Three-dimensional super-resolution imaging by stochastic optical reconstruction microscopy. Science. Feb. 8, 2008;319(5864):810-3. doi: 10.1126/science.1153529. Epub Jan. 3, 2008. PMID: 18174397; PMCID: PMC2633023.
Pavani SR, Thompson MA, Biteen JS, Lord SJ, Liu N, Twieg RJ, Piestun R, Moerner WE. Three-dimensional, single-molecule fluorescence imaging beyond the diffraction limit by using a double-helix point spread function. Proc Natl Acad Sci U S A. Mar. 3, 2009;106(9):2995-9. doi: 10.1073/pnas.0900245106. Epub Feb. 11, 2009. PMID: 19211795; PMCID: PMC2651341.
Backer AS, Backlund MP, von Diezmann AR, Sahl SJ, Moerner WE. A bisected pupil for studying single-molecule orientational dynamics and its application to three-dimensional super-resolution microscopy. Appl Phys Lett. May 12, 2014;104(19):193701. doi: 10.1063/1.4876440. PMID: 24926098; PMCID: PMC4032398.

Shechtman, Y., Sahl, S. J., Backer, A. S. & Moerner, W. E. Optimal point spread function design for 3D imaging. Phys Rev Lett. Sep. 26, 2014; 113(13): 133902. doi: 10.1103/PhysRevLett.113.133902.
Shechtman, Y., Weiss, L. E., Backer, A. S., Sahl, S. J. & Moerner, W. E. Precise Three-Dimensional Scan-Free Multiple-Particle Tracking over Large Axial Ranges with Tetrapod Point Spread Functions. Nano Lett. 15, 4194-4199 (2015). doi: 10.1021/acs.nanolett.5b01396.
Jia S, Vaughan JC, Zhuang X. Isotropic 3D Super-resolution Imaging with a Self-bending Point Spread Function. Nat Photonics. 2014;8:302-306. doi: 10.1038/nphoton.2014.13. PMID: 25383090; PMCID: PMC4224117.
Backer AS, Backlund MP, Lew MD, Moerner WE. Single-molecule orientation measurements with a quadrated pupil. Opt Lett. May 1, 2013;38(9):1521-3. doi: 10.1364/OL.38.001521. PMID: 23632538; PMCID: PMC3991307.
Shechtman Y, Weiss LE, Backer AS, Lee MY, Moerner WE. Multicolour localization microscopy by point-spread-function engineering. Nat Photonics. 2016;10:590-594. doi: 10.1038/nphoton.2016.137. Epub Aug. 8, 2016. PMID: 28413434; PMCID: PMC5391844.
Smith C, Huisman M, Siemens M, Grünwald D, Stallinga S. Simultaneous measurement of emission color and 3D position of single molecules. Opt Express. Mar. 7, 2016;24(5):4996-5013. doi: 10.1364/OE.24.004996. PMID: 29092328; PMCID: PMC5499633.
Backer AS, Moerner WE. Extending single-molecule microscopy using optical Fourier processing. J Phys Chem B. Jul. 17, 2014;118(28):8313-29. doi: 10.1021/jp501778z. Epub May 12, 2014. PMID: 24745862; PMCID: PMC4317050.
Dowski ER Jr, Cathey WT. Extended depth of field through wavefront coding. Appl Opt. Apr. 10, 1995;34(11):1859-66. doi: 10.1364/AO.34.001859. PMID: 21037731.
Ortyn WE, Perry DJ, Venkatachalam V, Liang L, Hall BE, Frost K, Basiji DA. Extended depth of field imaging for high speed cell analysis. Cytometry A. Apr. 2007;71(4):215-31. doi: 10.1002/cyto.a.20370. PMID: 17279571.
Linkert, M. et al. Metadata matters: access to image data in the real world. J Cell Biol (2010) 189 (5): 777-782. doi: 10.1083/jcb.201004104.
Blasi T, Hennig H, Summers HD, Theis FJ, Cerveira J, Patterson JO, Davies D, Filby A, Carpenter AE, Rees P. Label-free cell cycle analysis for high-throughput imaging flow cytometry. Nat Commun. Jan. 7, 2016;7:10256. doi: 10.1038/ncomms10256. PMID: 26739115; PMCID: PMC4729834.
Hennig H, Rees P, Blasi T, Kamentsky L, Hung J, Dao D, Carpenter AE, Filby A. An open-source solution for advanced imaging flow cytometry data analysis using machine learning. Methods. Jan. 1, 2017;112:201-210. doi: 10.1016/j.ymeth.2016.08.018. Epub Sep. 2, 2016. PMID: 27594698; PMCID: PMC5231320.
Shechtman Y, Gustavsson AK, Petrov PN, Dultz E, Lee MY, Weis K, Moerner WE. Observation of live chromatin dynamics in cells via 3D localization microscopy using Tetrapod point spread functions. Biomed Opt Express. Nov. 21, 2017;8(12):5735-5748. doi: 10.1364/BOE.8.005735. PMID: 29296501; PMCID: PMC5745116.
Shachar S, Voss TC, Pegoraro G, Sciascia N, Misteli T. Identification of Gene Positioning Factors Using High-Throughput Imaging Mapping. Cell. Aug. 13, 2015;162(4):911-23. doi: 10.1016/j.cell.2015.07.035. PMID: 26276637; PMCID: PMC4538709.
Weiss LE, Shalev Ezra Y, Goldberg S, Ferdman B, Adir O, Schroeder A, Alalouf O, Shechtman Y. Three-dimensional localization microscopy in live flowing cells. Nat Nanotechnol. Jun. 2020;15(6):500-506. doi: 10.1038/s41565-020-0662-0. Epub Apr. 20, 2020. PMID: 32313220.
Jianglai Wu et al: "A light sheet based high throughput 3D-imaging flow cytometer for phytoplankton analysis". Optics Express. Jun. 17, 2013;21(12):14474-80.

* cited by examiner

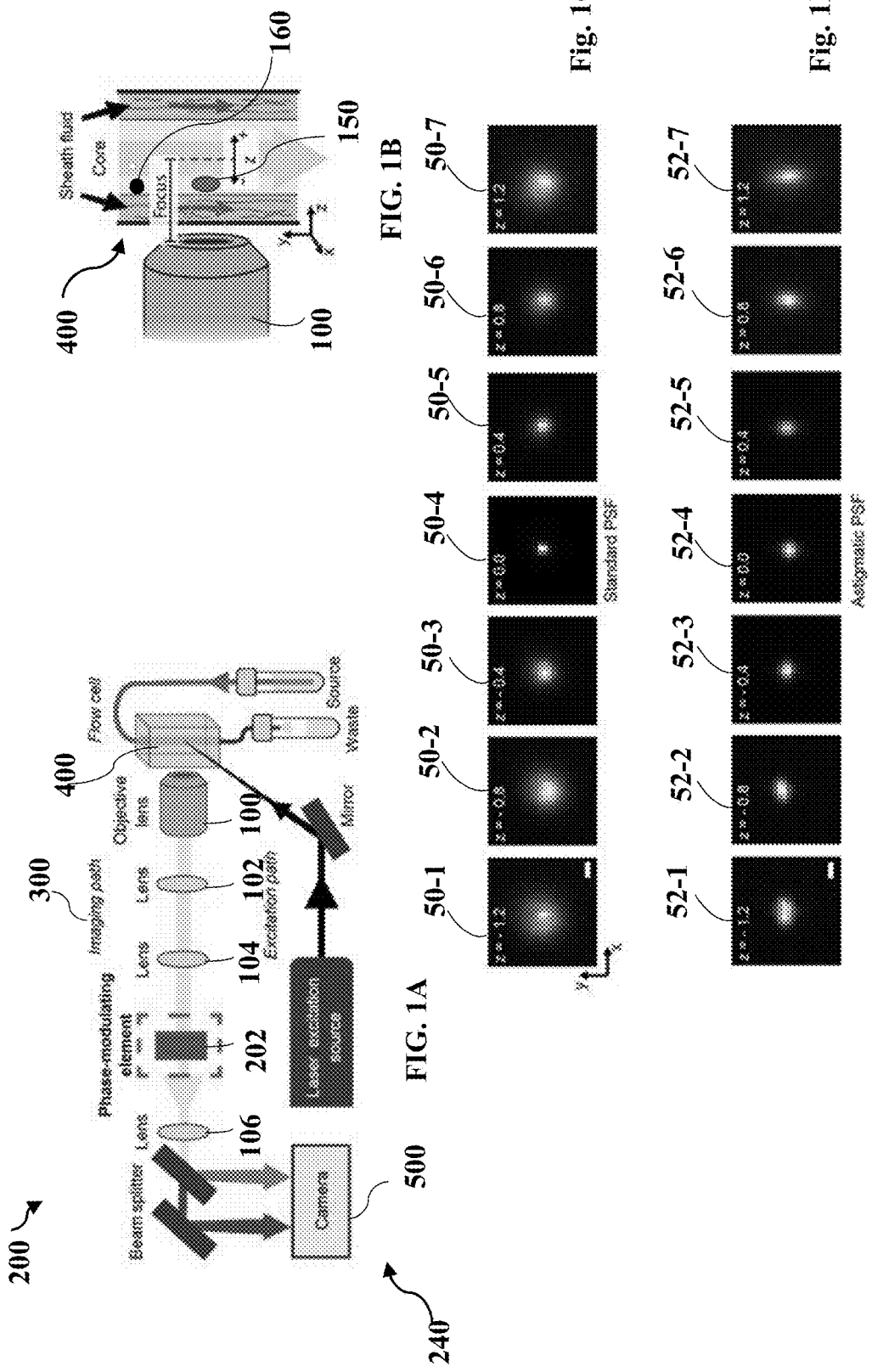

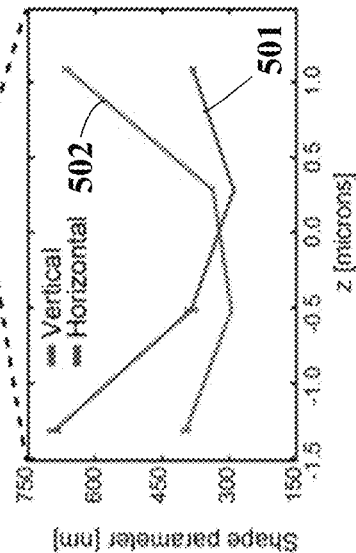
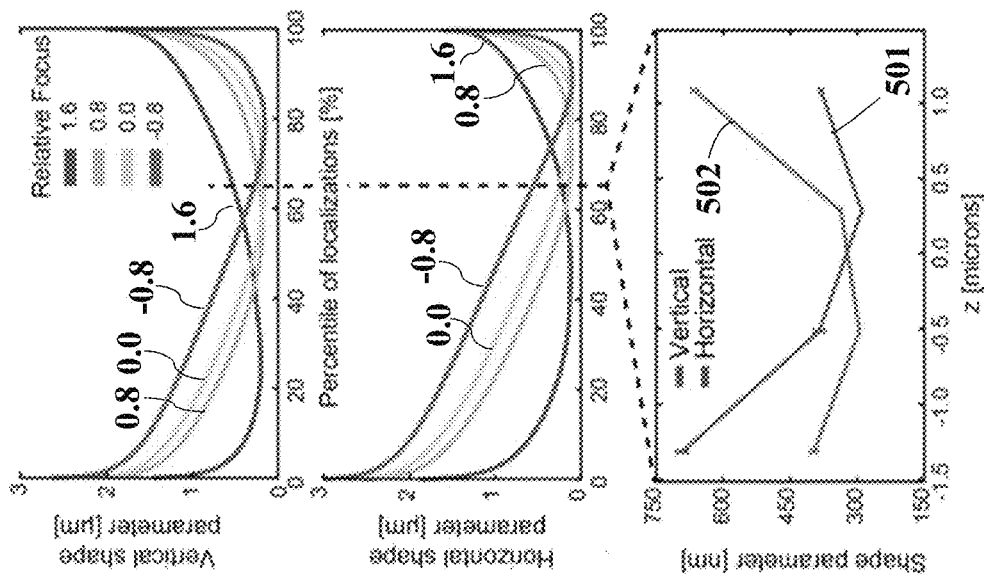
FIG. 3D
FIG. 3E
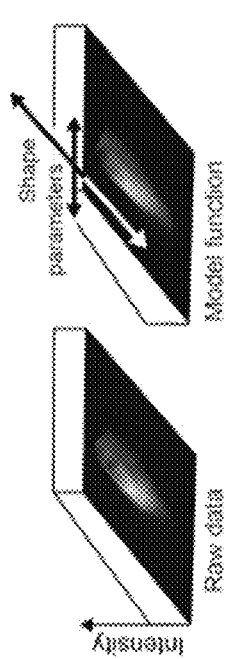
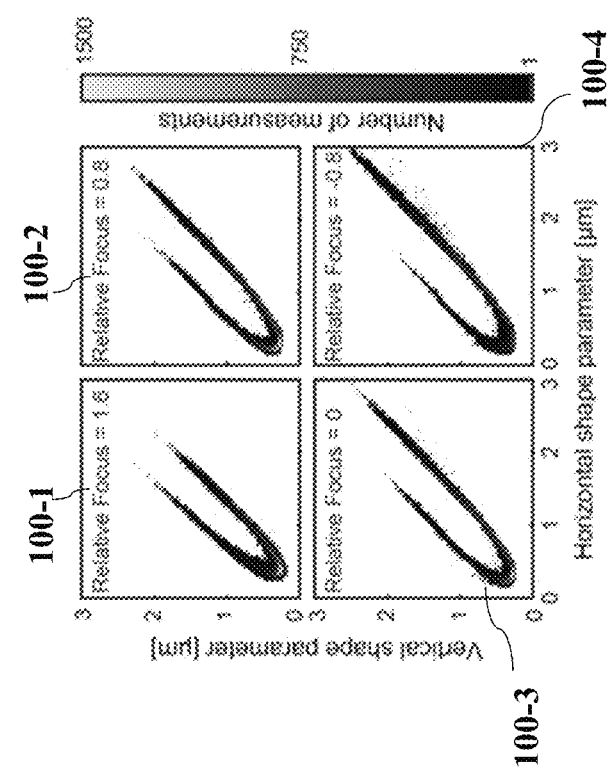
FIG. 3A
FIG. 3B
FIG. 3C

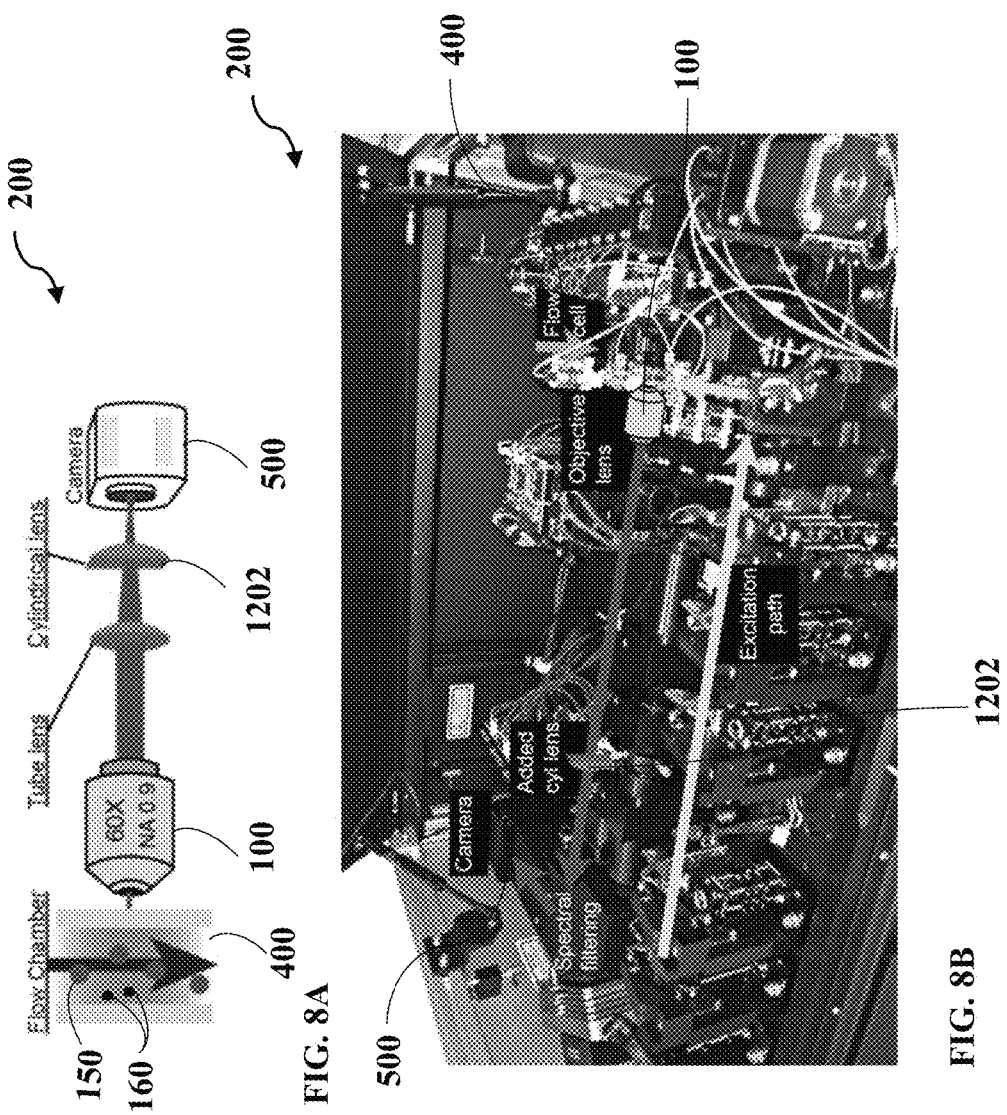
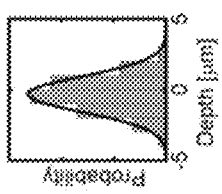
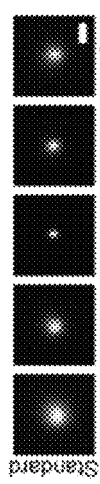
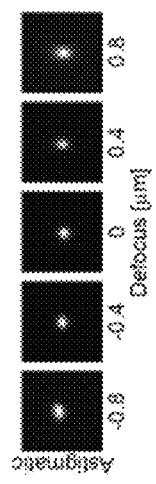
FIG. 8A
FIG. 8B
FIG. 8C
FIG. 8D
FIG. 8E

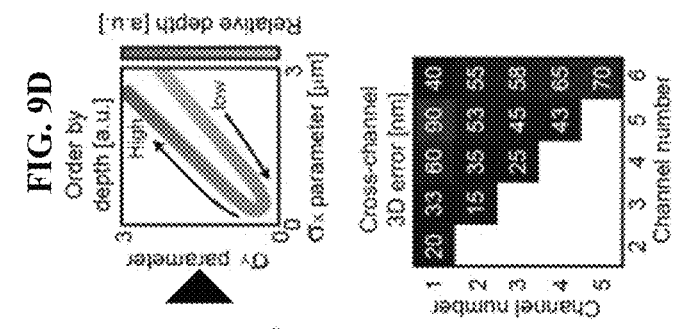
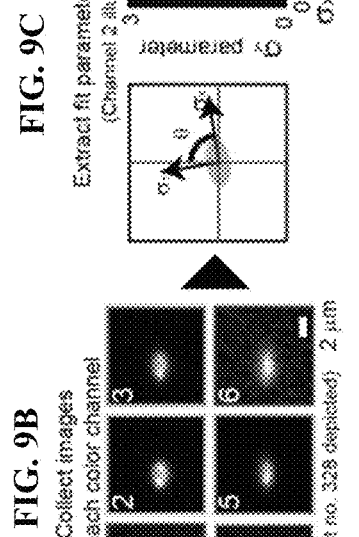
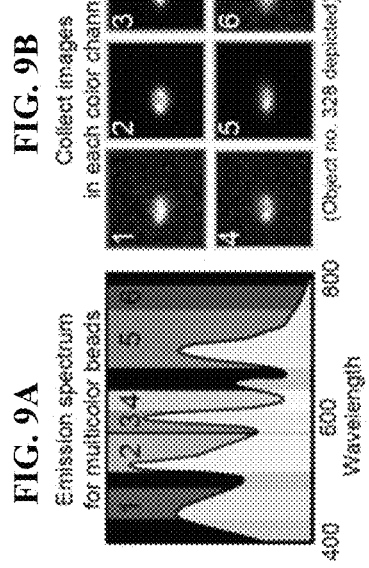
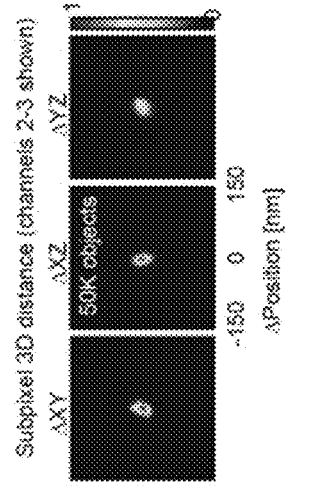
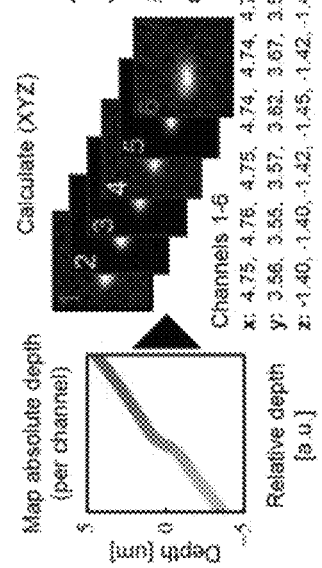
FIG. 9A FIG. 9B FIG. 9C FIG. 9D
FIG. 9E FIG. 9F FIG. 9G FIG. 9H

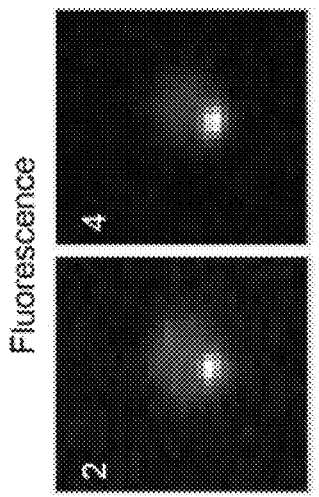
FIG. 11D
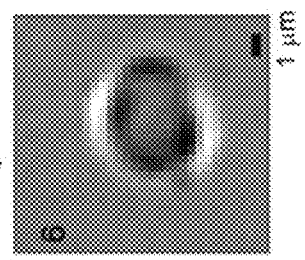
FIG. 11E
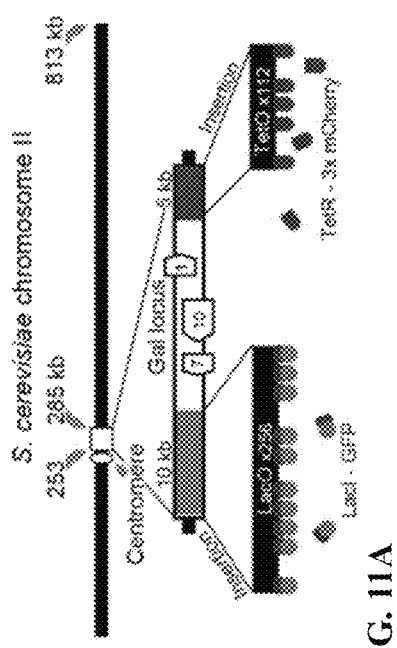
FIG. 11A
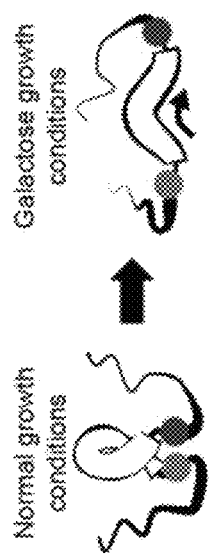
FIG. 11B
FIG. 11C

APPARATUS AND METHODS FOR HIGH THROUGHPUT THREE-DIMENSIONAL IMAGING

CROSS REFERENCE TO RELATED APPLICATIONS

This application is a National Phase of PCT Patent Application No. PCT/IL2019/050300 having, International filing date of Mar. 18, 2019, which claims the benefit of priority of U.S. Provisional Patent Application No. 62/644,513, filed Mar. 18, 2018, the contents of which are incorporated herein by reference in their entirety.

FIELD OF THE INVENTION

Some embodiments of the present invention relate generally to imaging systems and more specifically to three-dimensional imaging of an object.

BACKGROUND

Flow cytometry is a high-throughput system enabling the rapid characterization of cellular populations. Compared to traditional imaging methods, this accelerated process makes it possible to collect a sufficient quantity of data needed to analyze even small subpopulation with statistical significance.

Imaging flow cytometry (IFC) has integrated microscopy into these high-throughput systems, by replacing the canonical point detector(s) with a 2D camera, thus enabling widefield microscopy at high throughput. IFC is a powerful tool enabling high-throughput, generally two-dimensional imaging of objects, e.g. fluorescently labeled cells, in multiple color channels simultaneously. This is achieved by illuminating objects flowing through a microfluidic channel, spreading their emission spectrum with an optical element such as a prism or chromatic beam splitters, and capturing a set of images per object.

While imaging flow cytometry is an effective tool for high-speed acquisition and analysis of large cell and nano/micro-scale particle populations, analysis by imaging flow cytometry generally provides limited information particularly lacking detailed spatial information, e.g., depth information and three-dimensional imaging.

SUMMARY OF EMBODIMENTS OF THE INVENTION

Apparatus, systems, and methods are provided for facilitating three-dimensional imaging of an object, e.g., a fluorescent particle such as a fluorescently labeled cell, in high-throughput systems, such as Imaging flow Cytometry (IFC), in accordance with some applications of the present invention.

In accordance with some applications of the present invention, an optical phase-modulating element, e.g., a phase mask and/or a cylindrical lens, is arranged in an imaging path of the imaging flow cytometer (IFC) to modulate the light emitted from the object, such that a shape that the object creates on the imaging plane (i.e., the camera) of the imaging flow cytometer, namely, the point-spread function (PSF), is modified to provide depth-based characteristics of the object.

Additionally, provided is a calibration method for calibrating the modified point-spread function (PSF) by imaging flowing objects (e.g., fluorescent particles), thereby enabling the combined use of point-spread function (PSF) engineering with imaging flow cytometry (IFC) systems, in accordance with some applications of the present invention.

Typically, in order to calibrate a relation between a z-position of an object to the shape of its PSF, experimental PSFs are obtained that correspond to different z-positions of the object. In contrast to conventional microscopy, in which this type of calibration can be performed by scanning a static object at various, controllable distances from the microscope objective, in an imaging flow cytometry instrument, the depth of an individual flowing emitter (i.e., fluorescently-labeled objects which emit light) cannot be controlled to high accuracy. Therefore, imaging of objects while there is relative motion between the objects and the instrument, is performed for calibration, in accordance with some applications of the present invention.

More specifically, for some applications, a distribution of multiple calibration objects, e.g., emitting fluorescent beads, are imaged at multiple different positions of the calibration emitter objects. The multiple images are collected and fitted to characterize the change in the shape distribution at a range of microscope objective positions. By measuring the shift in the probability-distribution function (PDF) of PSF shapes, it is possible to compare the shapes at a single position of the calibration object in the flow cell of the imaging flow cytometer. This single position in the flow cell is a physical parameter that is independent of the objective lens position and can therefore be used to calibrate the system. A calibration curve is generated by decoding the PSF response for the sample of calibration objects and allows for mapping any measured PSF in cells examined in a biological sample (e.g., a biological sample of fluorescently labeled objects such as cells).

Following calibration of the point-spread function (PSF), images of the flowing objects of a biological sample (e.g. fluorescently labeled cells) are captured at high-throughput by the imaging flow cytometer, and depth-based information of the objects is obtained. For example, three-dimensional localization of fluorescent labels between different color channels, are obtained by algorithmic post-processing, in accordance with some applications of the present invention.

There is therefore provided in accordance with some applications of the present invention, an imaging system including:

a phase-modulating element configured and arranged with optics in an imaging path of an imaging system, to modulate light emitted from an object, while the object is in motion with respect to the imaging system, to create a modified point-spread function (PSF); and a processor configured and arranged to generate, on an image plane of the imaging system, a three-dimensional image from the modulated light to provide depth-based characteristics of the object.

For some applications, the phase-modulating element includes a cylindrical lens.

For some applications, the phase-modulating element includes a phase-mask.

For some applications, the phase mask includes a Tetrapod phase mask.

For some applications, the imaging system includes an Imaging Flow Cytometer (IFC).

For some applications, the processor is configured and arranged to generate the three-dimensional image by inferring depth of portions of the object based upon a tetrapod point-spread function (PSF).

For some applications, the processor is configured and arranged to generate the three-dimensional image by inferring depth of portions of the object based upon an astigmatic point-spread function (PSF).

For some applications, the processor includes imaging circuitry at the image plane in the imaging path and configured and arranged to detect light at or incident upon the imaging circuitry.

For some applications, the object includes a plurality of objects, and the processor is configured and arranged to generate the three-dimensional image indicative of respective depths of the plurality of objects that are co-localized between different color channels of the imaging system.

There is further provided in accordance with some applications of the present invention a method for producing a three-dimensional image of an object, while the object is in motion with respect to an imaging system used to produce the three-dimensional image of the object, the method comprising:

using a phase-modulating element, modifying light emitted from the object, to create a modified point-spread function (PSF);

detecting the modified light to generate image data; and using a processor, processing the image data to generate a three-dimensional image based on the modified the light to provide depth-based characteristics of the object.

For some applications, using the phase modulating element includes using a cylindrical lens.

For some applications, using the phase modulating element includes using a phase-mask.

For some applications, using the phase modulating element further includes inserting the phase modulating element into the imaging path of the imaging system.

For some applications, the processor includes imaging circuitry and detecting the modified light includes detecting the light by the imaging circuitry.

For some applications, the object includes a plurality of objects and generating the three-dimensional image further includes generating a three-dimensional image showing co-localization of the plurality of objects between different color channels of the imaging system.

For some applications, the object includes sample objects and calibration objects, and using the processor further includes generating a calibration curve using the calibration objects, and using the processor to generate the three-dimensional image comprises applying the calibration curve to images of the sample objects to infer depth of the object.

For some applications, using the processor includes generating the three-dimensional image by inferring depth of portions of the object based upon a tetrapod point-spread function (PSF).

For some applications, using the processor includes generating the three-dimensional image by inferring depth of portions of the object based upon an astigmatic point-spread function (PSF).

There is yet further provided in accordance with some applications of the present invention, a method for calibrating a point-spread function (PSF) of a microscope, including:

(a) introducing, a plurality of calibration objects having a known depth distribution into a flow imaging system such there is relative movement between the calibration objects and the flow imaging system;

(b) using a phase-modulating element arranged with optics in an imaging path of an imaging system, modifying light emitted from the calibration objects by modifying the light passing along the imaging path to create a modified PSF;

(c) capturing a plurality of images of the calibration objects at multiple different positions of the calibration objects;

(d) generating a calibration curve by decoding the PSF for the calibration objects;

(e) capturing an image of sample objects while there is relative movement between the sample objects and the flow imaging system and obtaining 3D positions of the sample objects by applying the calibration curve to the image of the sample objects.

For some applications, introducing includes introducing the plurality of calibration objects along with the sample objects.

For some applications, generating the calibration curve by decoding the PSF for the calibration objects includes the steps of (i) determining the probability distribution function (PDF) of the calibration objects, (ii) creating a relative position order based on the shape of the modified PSF of the calibration objects, (iii) each of the plurality of images of the calibration samples is assigned a depth according to the determined probability distribution function (PDF), and (iv) generating the calibration curve based on the assigned depth for the calibration objects.

For some applications, generating the calibration curve and obtained 3D positions of the sample object by applying the calibration curve includes providing a computer program product for administering processing of a body of data, the product including a computer-readable medium having program instructions embodied therein, which instructions, when read by a computer, cause the computer to generate the calibration curve and obtained 3D positions of the sample object by applying the calibration curve to the image of the sample object.

For some applications, applying the calibration curve includes comparing the sample object to the calibration curve to extract a depth-based characteristic of the sample object.

There is still further provided in accordance with some applications of the present invention, apparatus comprising an imaging flow cytometer adapted to provide depth-based characteristics of a sample object while there is relative movement between the sample object and the imaging flow cytometer, the apparatus comprising:

(a) a flow cell chamber into which the sample object is introduced along with a plurality of calibration objects while there is relative movement between the sample object, the calibrations objects and the flow cell chamber;

(b) optics configured to pass light from the sample objects and from the calibration objects along an imaging path to an imaging plane;

(c) a phase-modulating element configured and arranged with the optics in the imaging path, to modify light emitted from the sample and calibration objects, by modifying the light passing along the imaging path to create a modified point-spread function (PSF);

(d) a processor configured to calibrate the modified PSF based on decoding the PSF for the calibration objects, and to generate a three-dimensional image of the sample object, based on the calibration of the modified SPF.

For some applications, the phase-modulating element includes a cylindrical lens.

For some applications, the phase-modulating element includes a phase-mask.

For some applications, the phase mask includes a Tetrapod phase mask.

For some applications, the processor is configured to generate the three-dimensional image by inferring depth of portions of the object based upon a tetrapod point-spread function (PSF).

For some applications, the processor is configured to generate the three-dimensional image by inferring depth of portions of the object based upon an astigmatic point-spread function (PSF).

For some applications, the processor includes imaging circuitry at the image plane and configured and arranged to detect light at or incident upon the imaging circuitry to generate image data.

For some applications, the sample object includes a plurality of objects, and the processor is configured to generate the three-dimensional image indicative of respective depths of the plurality of object that are co-localized between different color channels of the imaging flow cytometer.

The present invention will be more fully understood from the following detailed description of embodiments thereof, taken together with the drawings, in which:

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A is a schematic illustration of apparatus comprising a phase-modulating element inserted into an imaging path of an imaging flow cytometer, in accordance with some applications of the present invention;

FIG. 1B is a schematic illustration of components of the apparatus, in accordance with some applications of the present invention;

FIGS. 1C-D illustrate standard point spread function (PSF) of light-emitting particles at various defocused (z) positions (1C), and modified PSF (e.g., astigmatic PSF) due to the incorporation of a phase-modulating element (1D), in accordance with some applications of the present invention;

FIGS. 3A-E illustrate steps in calibration of the point-spread function (PSF), in accordance with some applications of the present invention;

FIGS. 8A-E illustrate 3D microscopy in an imaging flow cytometer, in accordance with some applications of the present invention;

FIGS. 8F and 9A-H illustrate PDF-based 3D localization calibration, in accordance with some applications of the present invention;

FIGS. 11A-G illustrate high-throughput imaging of live yeast in 3D, in accordance with some applications of the present invention.

DETAILED DESCRIPTION OF APPLICATIONS

Figure 1E:
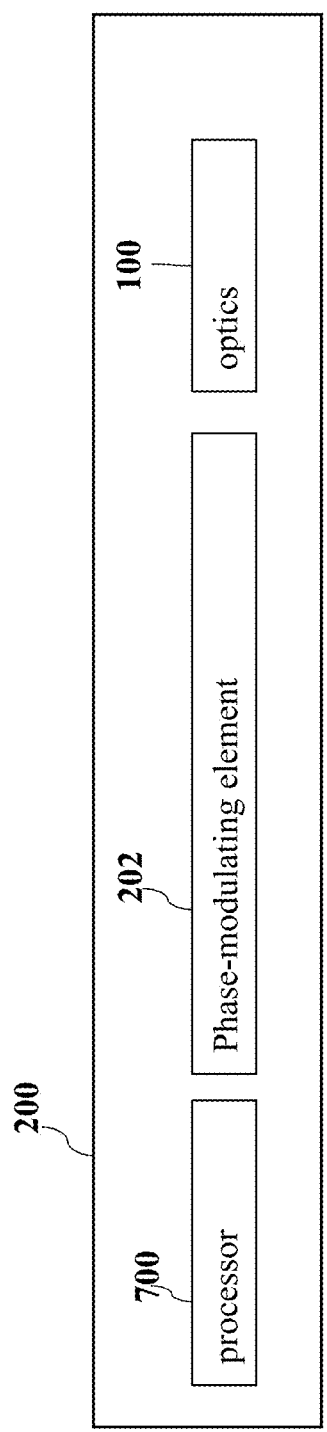
FIG. 1E is a schematic illustration of components of the apparatus, in accordance with some applications of the present invention.

In accordance with some aspects of the present invention, Imaging Flow Cytometry (IFC) is combined with point-spread function (PSF) engineering techniques.

Some aspects of the present invention are applicable to a variety of different types of apparatuses, systems and methods involving a phase-modulating element that modulates light passed to from an object, and a processor comprising circuitry for generating a three-dimensional image by using the modulated light (and modified PSF) to provide depth-based characteristics of the object.

In accordance with some aspects of the present invention, a high throughput imaging system is adopted to perform three-dimensional imaging of an object. For example, an imaging flow cytometer instrument is adopted to provide enhanced spatial resolution (i.e., depth information) of a fluorescent object in flow such as a fluorescently-labeled cell. Typically, an optical element such as a phase-modulating element is introduced into an imaging (optical) path of the imaging flow cytometer in order to modify a light emitted from the object to create a modified point-spread function (PSF), to provide depth-based information of the object.

In accordance with some aspects of the present invention, the phase-modulating optical element comprises a cylindrical lens.

In accordance with some aspects of the present invention, the phase-modulating optical element comprises a phase-mask, e.g., a Tetrapod phase-mask.

In accordance with some aspects of the present invention, a method is provided comprising the steps of: 1. inserting an additional optical phase modulating element (e.g., a phase mask or a cylindrical lens) into the imaging path of the imaging flow cytometer; 2. capturing images of flowing sample objects (e.g. fluorescently labeled cells) along with a sample of calibration objects, (e.g., fluorescent beads), that follows a known (or measurable) depth distribution; 3. Generating a calibration curve by decoding the PSF response for the calibration sample; and 4. obtaining 3D positions of the objects (e.g. fluorescently labeled cells) by applying the obtained calibration curve to new images which can be colocalized between color channels.

Methods Used in Some Applications of the Present Invention

A series of protocols are described hereinbelow which may be used separately or in combination, as appropriate, in accordance with applications of the present invention. It is to be appreciated that numerical values are provided by way of illustration and not limitation. Typically, but not necessarily, each value shown is an example selected from a range of values that is within 10% of the value shown. Similarly, although certain steps are described with a high level of specificity, a person of ordinary skill in the art will appreciate that other steps may be performed, mutatis mutandis.

In accordance with some applications of the present invention, the following methods were applied:

Sample Preparation for IFC

Prior to imaging in the Amnis ImageStream®X ($IS^X$), imaging flow cytometer instrument, cell samples were diluted to <$2 \times 10^5$ objects per µl, mixed with fluorescent beads, and loaded into instrument. This density was chosen to balance a reasonable acquisition rate (~100 objects per second) while keeping the probability of imaging multiple particles at the same time relatively low. Using an unmodified flow speed for the 60× objective lens and a core diameter setting of 7 µm, around 10% of images contained multiple objects and were removed from subsequent analysis for simplicity.

For calibration, 0.2 µm diameter TetraSpeck (TS) beads (Invitrogen, cat. T7280) were diluted 1:200 in water or PBS (phosphate-buffered saline, Sigma cat. P5368 dissolved in 1 L dd$H_2O$; NaCl 0.138 M, KCl 0.0027 M, pH 7.4) to a final density of $1 \times 10^5$ beads per µl, which translated into between 150 objects imaged per second.

DNA nanorulers (GATTAquant DNA Technologies) with a designed length of 180 nm separating two groups of emitters at either end (ATTO 647N and ATTO 488) were prepared for IFC as follows: 2-4 nM stock was diluted 1:200 in 1×TAE/10 mM $MgCl_2$. (1×TAE contains 4.844 g Tris, 1.21 ml acetic acid, and 0.372 g EDTA in 1 L ddH2O). Fluorescent beads were then added to the solution prior to imaging as described earlier. For standard microscopy, nanorulers were prepared using the protocol provided by the manufacturer. Briefly, clean coverslips with a custom PDMS (polydimethylsiloxane) chamber were washed three times by pipetting 400 µl of PBS (phosphate buffered saline, Sigma P5368; 1 L contains NaCl 0.138 M, KCl 0.0027 M; pH 7.4). Coverslips were then incubated for 5 min with 200 µl BSA-biotin (biotin-labeled bovine serum albumin, Sigma cat. A8549) diluted to 1 mg/1 ml in PBS (initial dilution of 1 mg in 900 µl ddH2O [doubly-distilled water] followed by addition of 100 µl OX PBS). BSA-biotin solution was removed by pipetting and coverslips were washed three times with 400 µl PBS. Coverslips were incubated for 5 min with neutravidin (Sigma cat. 31000) diluted to 1 mg/ml in PBS (initial dilution of 1 mg in 900 µl ddH2O followed by addition of 100 µl 10×PBS). Neutravidin solution was removed and coverslips were washed three times with 400 µl PBS/10 mM MgCl2 (stock solution of 1M MgCl2 was prepared from anhydrous MgCl2, Alfa Aesar cat. 12315). 1 µl of DNA nanoruler sample (stock concentration 2-4 nM) was diluted in PBS/10 mM MgCl2. The entire 200 µl were then deposited on the coverslips. All liquid components were vortexed briefly before deposition. The deposition protocol was carried out at room temperature.

Yeast cells were cultured by standard growth protocols. Briefly, cultures were chosen from single colonies grown on non-selective YEPD agar. Strains were grown 24-30 h in SC (synthetic complete media) with 2% raffinose (Alpha Aesar, cat. A18313), then overnight in YEP-lactate (10 g Bacto yeast extract [BD, cat. 212750], 20 g Bacto peptone [BD, cat. 211677], 12 g NaOH and lactic acid [Fisher Sci., cat. L/0150/PB08] added to decrease the pH, in 1 L ddH2O). Cultures were diluted the next morning to an OD of approximately 0.3 in YP (10 g Bacto yeast extract, 20 g Bacto peptone) with either 2% galactose (Acros, cat. 150615000) or 2% glucose (Sigma, cat. G5767). Cells were then grown to the log phase (OD of 0.5-1). Immediately before imaging, cells were centrifuged and resuspended in filtered ddH2O twice to avoid autofluorescence of YP.

ddH2O, PBS, TAE and MgCl2 solutions were sterile filtered (0.22 um). SC, YP, and YP buffers containing various carbon sources were either sterile filtered or autoclaved.

Alignment of the Cylindrical Lens

Figure 8F:
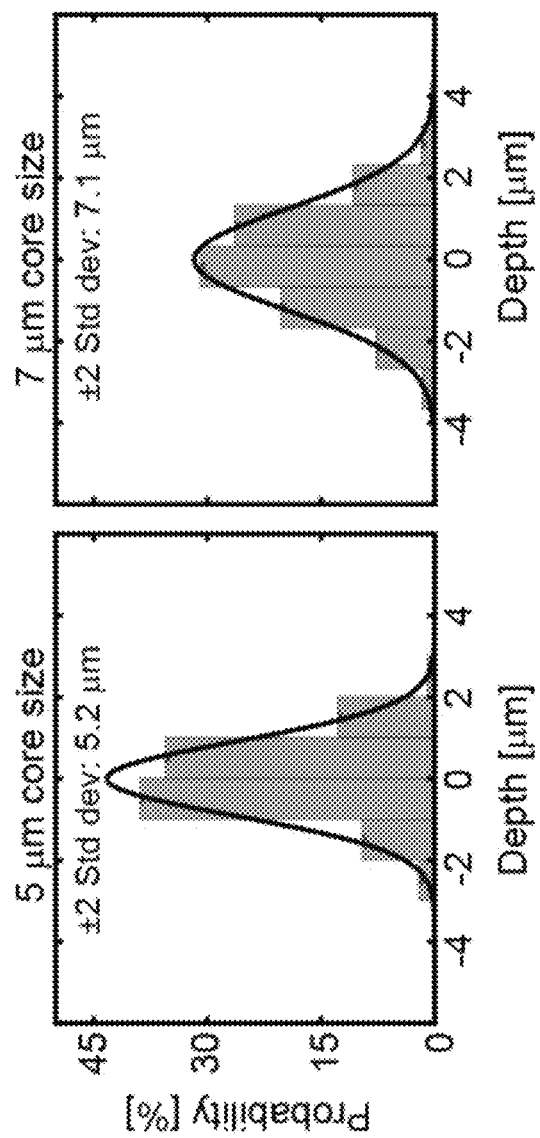

The placement of the cylindrical lens in the $IS^X$ imaging flow cytometer was determined by the practical consideration of available space (FIG. 8B). The cylindrical lens was mounted on a translatable X-Y mount (Thorlabs) and the position was adjusted to find the position with the best PSF response. Once the optimal position was determined, the device was placed on a magnetic stage so as to easily switch between 2D and 3D modes.

Alignment and Installation of the Phase Mask

The Tetrapod phase mask was mounted in a custom-machined adapter designed to fit in the filter wheel located at a plane conjugate to the back focal plane of the objective. Fine X-Y adjustments of the mask were performed manually.

Imaging Flow Cytometry Settings

Unless stated otherwise, default ImageStream parameters were used for data collection. Important ImageStream settings were: Magnification 60× (corresponding to slowest flow rate), Core Diameter 7 µm, and Focus set to a single typically in the range of [−2.5, 2.5] µm for all experiments on a given day. In advanced settings, Autofocus was set to OFF (default was ON), ObjectMaskCoeffParam was set to 0 (default was 0.8), and Keep Clipped Objects was set to ON (default was OFF) to retain full object images in the presence of the modified PSF image.

For DNA nanoruler samples, the sheath buffer was replaced with 1×TAE/10 mM $MgCl_2$ to avoid possible changes in origami structure due to changes in ionic strength of the buffer.

Data Preparation

There were two steps of data preparation before 3D localization: object classification, and assignment of offset X, Y position.

Bead and non-bead objects were classified using the data in the exported feature file generated by IDEAS. The feature Image_MC<channel number> provided good classification, with channels 3 and 5 working best for our samples. According to the IDEAS manual, this feature is "the sum of the pixel intensities in the mask, background subtracted". The intensity gates classifying the bead and test populations were defined on files containing only one of the two populations.

It is noted that the described classification scheme worked well due to the high fluorescence of the fluorescent beads relative to both the cells and the nanorulers. More general classification schemes might require use of the full image data rather than relying on exported feature parameters. Finally, in the case of highly similar calibration and test samples, it might be necessary to measure the beads separately. This, however, could introduce errors due to differences in the core parameters for the calibration beads and the test sample.

The absolute XY position of an emitter with respect to the relevant CCD channel is the sum of its position in the image frame and the offset of the image frame with respect to the CCD channel. The offsets in X and Y are the exported feature parameters Raw_Centroid_X and Raw_Centroid_Y.

According to the IDEAS manual, "the centroid X and Y of the original position of the image during acquisition before it was centered IDEAS".

Software

NIS Elements software (Nikon, Japan) was used to acquire standard microscopy images of the DNA nanorulers, and of fluorescent 200 nm beads used for registration of the standard microscopy images.

The Fiji distribution of ImageJ with added Thunderstorm plugin was used for localization of point emitters in both standard-microscopy registration and DNA nanoruler images.

Imaging flow cytometery datasets (.cif files) were generated using INSPIRE software (Amnis, part of EMD Millipore). Post-experiment, feature data for all objects was exported to .txt format using IDEAS software (Amnis). The feature data was useful for rapid classification of objects as either calibration beads or cells/DNA nanorulers.

Matlab (Mathworks, version 2017b) with Bioformats package was used for analysis of all .cif data from cell and nanoruler samples. Matlab with Bioformats was also used for opening standard microscopy .nd2 files, used for verification of co-localization of the two emission channels, and calculation of distances between DNA nanoruler ends.

Bioformats Matlab Package Installation

The Open Microscopy Environment (OME) Bioformats package (version 5.8.2) was downloaded from the OME website.

Computer Requirements Information

Java memory limits were increased to maximum in the Matlab with Bioformats environment.

Extracting Fit Parameters

Intensity images I(x,y) of beads and DNA nanoruler objects (i.e., calibration objects) were fit using nonlinear least-squares (Matlab's lsqnonlin function) to the following 2D Gaussian model:

$$I(x,y) = A \exp\{-(a(y-y_0)^2 + 2b(y-y_0)(x-x_0) + c(x-x_0)^2)\} + B,$$

where B is a constant background intensity, A is the maximum intensity, and $(x_0, y_0)$ is the x-y position of the emitter. The widths $\sigma_1$ and $\sigma_2$ of the 2D Gaussian and its rotation $\theta$ from the CCD axis are related to a, b and c as follows:

$$a = \left(\frac{\cos\theta}{\sqrt{2}\,\sigma_1}\right)^2 + \left(\frac{\sin\theta}{\sqrt{2}\,\sigma_2}\right)^2$$

$$b = -\frac{\sin 2\theta}{4\sigma_1^2} + \frac{\sin 2\theta}{4\sigma_2^2}$$

$$c = \left(\frac{\cos\theta}{\sqrt{2}\,\sigma_2}\right)^2 + \left(\frac{\sin\theta}{\sqrt{2}\,\sigma_1}\right)^2$$

The axes of the 2D Gaussian were defined as follows: the positive $\sigma_2$ axis is rotated 90° clockwise from the positive $\sigma_1$ axis. The positive axis of $\sigma_1$ may be rotated in the range of (−45°, 45°) with respect to the positive Y axis of the CCD. This results in the positive axis of $\sigma_1$ aligned closer to the Y axis of the CCD, and the positive axis of $\sigma_2$ aligned closer to the X axis of the CCD.

Emitters within cells were fit to the following model:

$$I(x,y) = A \exp\{-(a(y-y_0)^2 + 2b(y-y_0)(x-x_0) + c(x-x_0)^2)\} + B(x,y),$$

where B(x,y) is a position-dependent background intensity due to cell fluorescence, defined as:

$$B(x,y) = M(x,y) \times E(x,y),$$

where M(x,y) is the Gaussian-filtered version of the 0-1 mask that defines the cell pixels (as opposed to empty image area), and E(x,y) is the Gaussian-filtered version of the same mask multiplied by the median cell pixel value, with a different blur parameter. Blur parameters for the two Gaussian filters were chosen by visual comparison of model and experimental data.

Parameterizing the Gaussian Fits

To parametrize the $(\sigma_1, \sigma_2)$ data for all emitters (i.e., objects) on each channel, the points were first divided into those on the upper and lower approximately-linear "arms" of the data, and the "central region" for which the values of $\sigma_1$ and $\sigma_2$ are relatively close. For each "arm", first the best linear fit was found for the data points. The data points of the arm were then binned into non-overlapping, un-gapped rectangular regions with two sides parallel to the linear fit and on either side of it. For the "central region", the data points were binned into triangular regions. The bases of the triangles were parallel to the local tangent to the curve, and the vertex opposite the base (common to all triangles) was located on the left edge of the leftmost rectangular regions of the two "arms". For each geometric binning region, the mean position was calculated over all points that were binned into the region. These representative points were fit using a weighted spline, with the weights determined by the number of points into each binning region. This defined a parametrization M: P*→v for points P*=$(\sigma_1, \sigma_2)$ located on the curve. The range of v was arbitrary.

Mapping to Absolute Depth within the Stream

Distribution of particle density was determined as a function of position within the core of the flow as follows: first, data was collected from fluorescent 200 nm beads for different positions of the focal plane with respect to the core in 1 μm increments, over a range of 10∝cm, with constant core diameter of either 5 or 7 μm and in the absence of the astigmatic lens. The fraction of objects in focus at each distance from the objective f was $$p(f) = \frac{N_{focus}(f)}{N_{total}},$$

where $N_{total}$ is the total number of objects collected, and $N_{focus}$ is the number of objects for which $\sqrt{\sigma_1^2 + \sigma_2^2} < D$. The value of D was chosen to be small enough so that $\Sigma_f p_f < 1$, indicating that objects were not defined to be in focus for more than one focal position f, and large enough to include a large number of objects and thus ensure a statistically small error for p(f). The resulting p(f) values were fit to a Gaussian distribution (see FIGS. 8C and 8F), resulting in mean $\mu_{fit}$ and standard deviation $\sigma_{fit}$. It was found that $\sigma_{fit}$ corresponds well to the core diameter setting in the INSPIRE software.

To map a sample data point P=$(\sigma_1, \sigma_2)$ to absolute depth Z, first P* was found, the closest point to P located on the parametrization curve M: P*→v. Then the parameter value v was assigned to P. After calculating the parameter values for all N points in the dataset, the points in the dataset according to the assigned parameter values were ordered. Followed by calculation of the inverse of the normal cumulative distribution function with mean 0 and standard deviation $\sigma_{fit}$, at N points linearly spanning the range [1,N), resulting in N values of Z spanning the width of the stream core, with Z=0 as the center of the core. Finally, these Z values were assigned to the parameter-ordered data points.

Multicolor Channel Registration

After fitting the fluorescent beads, the mean position over all beads was calculated for each channel c*. Bead positions on each channel $(x_0, y_0)_{c^*}$ were then redefined as:

$$(x_r, y_r)_{c^*} = (x_0, y_0)_{c^*} - \frac{1}{N_c} \sum_{c=1}^{N_c} \overline{(x_0, y_0)_c},$$

where $N_c$ is the number of channels, and $\overline{(x_0, y_0)_c}$ is the mean position of emitters on channel c.

Removing Bad Localizations

Images containing more than one emitter were omitted from analysis. The number of emitters was determined by counting the number of non-contiguous subsets of image pixels with intensities above an image-dependent threshold (set to 2 standard deviations above the mean intensity of the edge pixels).

Emitters localized to $x_0$ or $y_0$ (taking into account image frame offset with respect to CCD channel) within 15% of the extremal $x_0$ or $y_0$ values for the channel were removed. Emitters mapped to z depths in the extreme 15% of all z values were also removed.

Figure 10A:
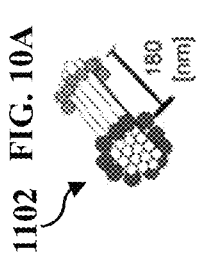
FIGS. 10 A-F illustrate imaging of fluorescent nanorulers by 3D IFC, in accordance with some applications of the present invention.
FIGS. 10G-I illustrate measurements of DNA nanorulers, in accordance with some applications of the present invention.
FIG. 10J illustrates simulated 3D distance measurements, in accordance with some applications of the present invention.
Figure 10B:
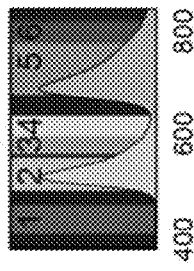
Figure 10C:
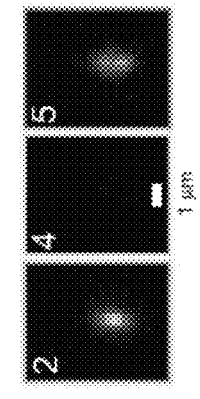
Figure 10E:
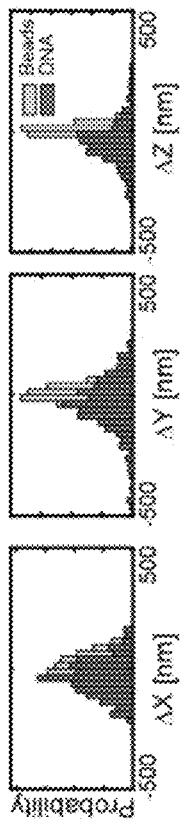
Figure 10D:
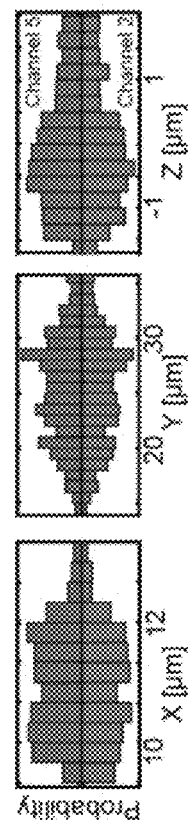
Figure 10F:
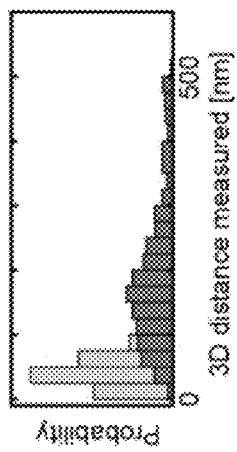
Figure 10G:
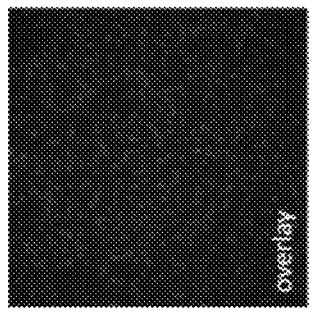
Figure 10G:
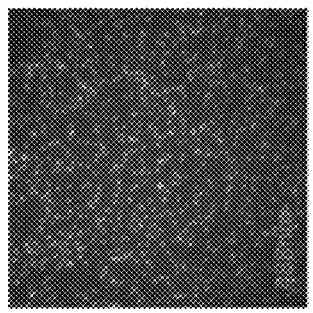
Figure 10G:
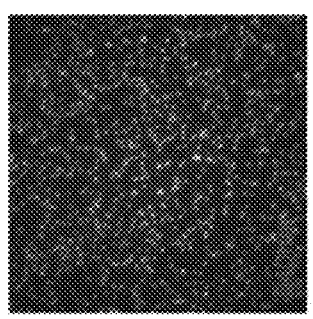
Figure 10H:
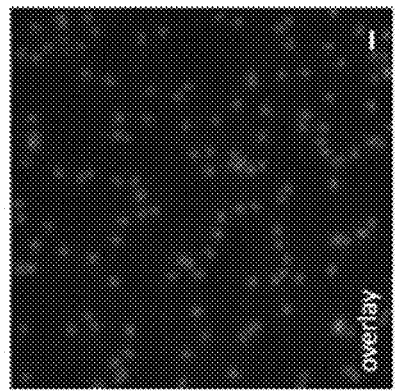
Figure 10I:
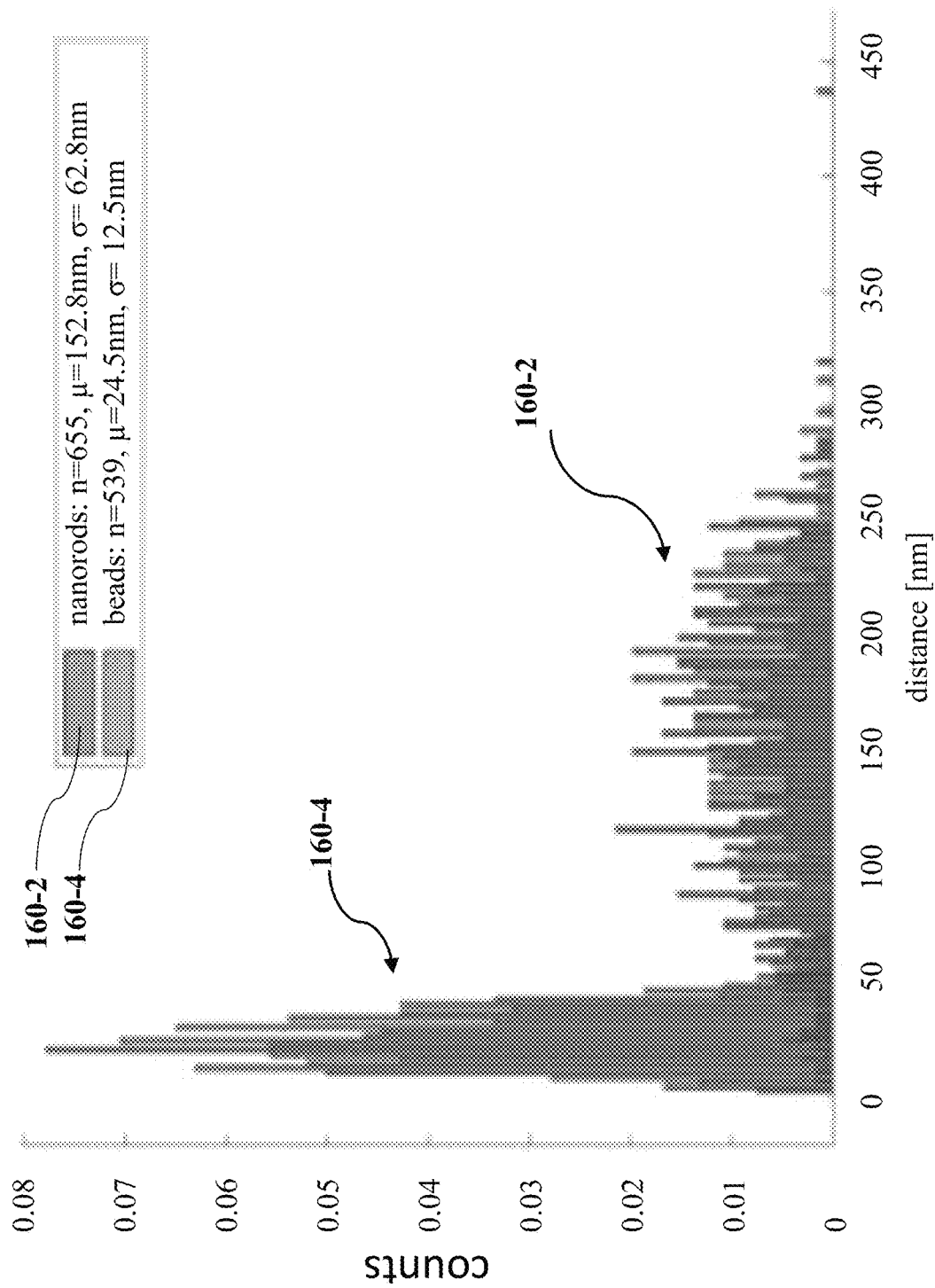
Figure 10J:
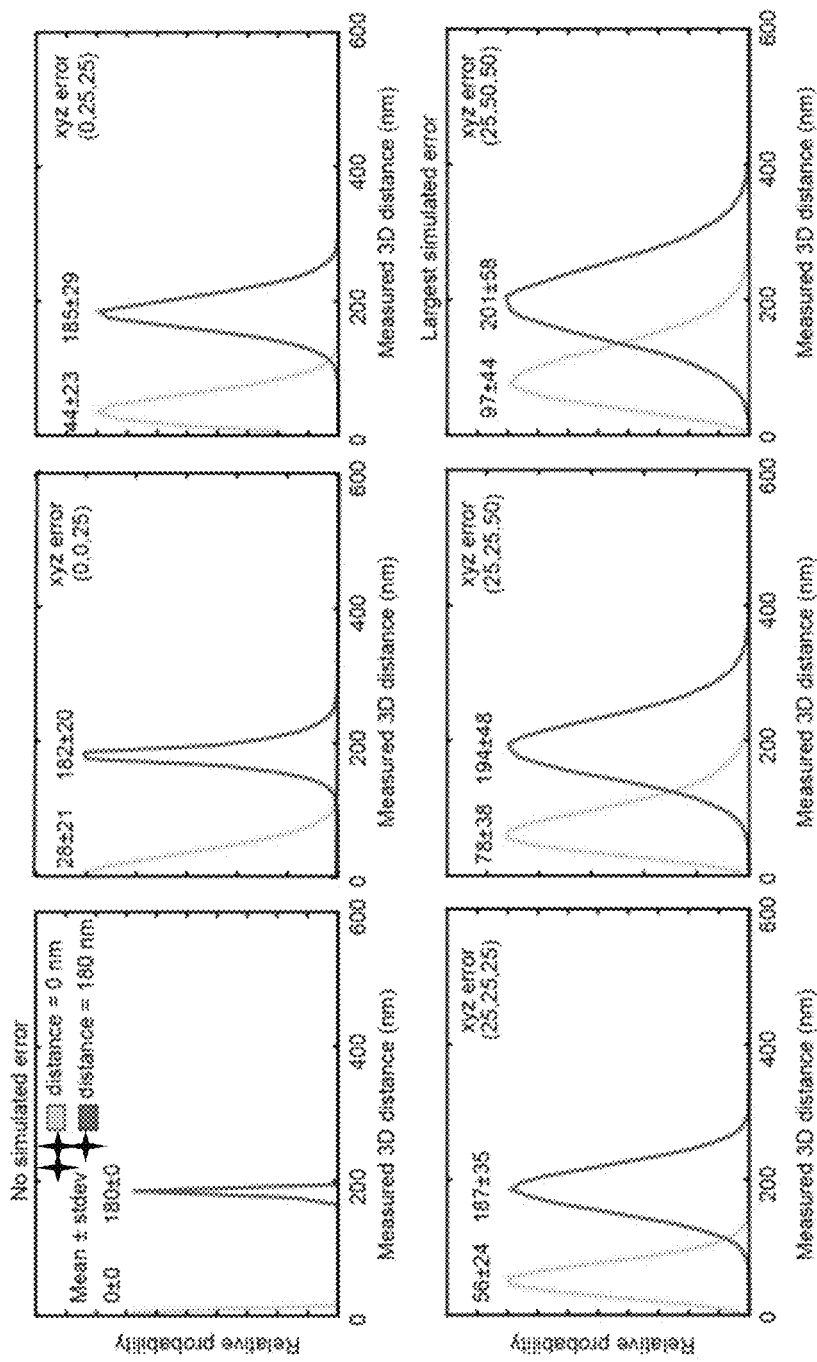

Standard Microscopy Validation 2D distances between the fluorescently-labeled ends of the DNA nanorulers were measured using an inverted Nikon Ti microscope with 100× magnification. 647 nm and 505 nm emission channels were registered using 200 nm tetraspeck beads. The histogram of measured distances for beads and nanorulers is shown in FIGS. 10G-I.

2D distances between cells with fluorescently-labeled chromatin were measured on the ImageStream, using the same settings as for the 3D data, only with the cylindrical lens removed.

Reference is made to FIGS. 1A, 1B and 1E which are schematic illustrations of components of apparatus 200, in accordance with some applications of the present invention.

FIG. 1A is a schematic illustration of apparatus 200 comprising a phase-modulating element 202 arranged in imaging path (i.e., an optical path) 300 of an imaging flow cytometer 240, in accordance with some applications of the present invention.

As shown, apparatus 200 is an imaging system comprising a modified imaging flow cytometer 240. Typically, modified imaging flow cytometer 240, comprises a standard imaging flow cytometer modified with a phase-modulating element 202.

As illustrated in FIG. 1A, apparatus 200 comprises an imaging path 300. Imaging path 300 is from an object (e.g., object 150 and/or object 160) in flow cell 400 to the camera 500 which is the image plane. The object, in accordance with some applications of the present invention, is a fluorescently labeled emitter, e.g., a cell (object 150) or a bead (object 160), that is in relative motion with the imaging system. Imaging path 300 includes some or all of optics 100, 102, 104 and 106 configured to pass emitted light from object 150 towards camera 500. Typically, the optics comprise at least one focusing lens (e.g., objective 100). For some applications, additional lenses 102, 104 and 106 are also provided in the imaging plane. Phase-modulating element 202 is introduced into imaging plane 300, e.g., between lenses 104 and 106, to facilitate generating a three-dimensional imaging of object 150.

Typically, phase-modulating element 202 is configured to induce a modification in the light from the object to produce modified light, such that a point-spread function (PSF) is modified to provide the three-dimensional image of object 150. For some applications, phase-modulating element 202 comprises a phase-mask. Alternatively, phase-modulating element 202 comprises a lens, e.g., a cylindrical lens.

Typically, apparatus 200 comprises a processor 700 comprising circuitry configured to generate a three-dimensional image by using the modified light to provide depth-based characteristics of the object. In other words, processor 700 infers depth information about objects that are imaged. For example, processor 700 can be configured to infer depth of portions of the object based on the modified PSF created by phase-modulating element 202. For some applications, processor 700 generates comprises imaging circuitry at image plane 500 for detecting the modified light to generate image data. Processor 700 uses the modified shape (i.e., the modified PSF) to provide depth-based characteristics of the object to generate a 3D image from the light detected via processor 700. Typically, the depth-based characteristics include the 3D position information (x, y, and z) and/or axial dimension (z).

For facilitating easy insertion and alignment of phase-modulating element 202 into imaging flow cytometer 240 (and subsequent removal as desired), the phase-modulating element 202 is placed on a magnetic mount within an x-y translatable mount (Thorlabs). For some applications, a position of phase-modulating element 202 is in a Fourier plane of the microscope. There is significant robustness to the exact position, within the optical system in order to modulate the PSF, and therefore it can be placed approximately as shown in FIG. 1A. Following initial insertion of phase-modulating element 202, phase-modulating element 202 is typically translated in x and y until the point-spread function (PSF) appears symmetrical for a maximum number of emitters (i.e., light-emitting particle objects), i.e. the system was focused on the center of the particle stream within the core fluid (FIG. 1). It is noted that insertion and alignment of phase-modulating element 202 into imaging flow cytometer 240 is easily accessible and generally does not require specialized equipment or access to parts of the flow cytometer that are not readily accessible.

Following insertion and alignment of phase-modulating element 202, the three-dimensional point-spread function (PSF) is calibrated (i.e., a relation between the z-position of an emitter and the shape of its PSF is calibrated). Typically, a z-response of a microscope is calibrated by scanning a sample of static, bright emitters (e.g., fluorescent beads on a coverslip) in known increments. However, in cases of imaging flow cytometry, the emitters are not static (i.e., stationary) emitters, but rather the emitters are flowing emitter particles, and the z-distribution of the flowing emitter particles is random; namely, the position of any given emitter has the potential to be in any number of positions, as shown in FIG. 1B. Therefore, a calibration protocol is provided in accordance with some applications of the present invention, which is tailored to the unique requirements of a high throughput system such as IFC in combination with PSF engineering.

Typically, the calibration protocol described herein, is based on image statistics rather than on static emitters. In general, following introduction of phase-modulating element 202 into imaging path 300 of an imaging flow cytometer 240, multiple images of flowing objects (e.g. fluorescently labeled cells) along with a calibration sample (e.g., fluorescent beads), are captured. Typically, the calibration sample of the fluorescent beads follows a known (or measurable) depth distribution. A calibration curve is then generated by decoding the PSF response for the calibration sample of fluorescent beads. By applying the obtained calibration curve to images obtained from fluorescently labeled cells, 3D information (e.g., multicolor colocalization), is derived. It is noted that FIG. 1B (as well as FIGS. 8A and 12B described elsewhere herein) show the sample of calibration objects 160 together in the flow cell with sample objects 150, by way of illustration and not limitation. Calibration experiments using calibration objects 160 may be done before or after imaging of sample objects 150.

Reference is now made to FIGS. 1C-D, and FIGS. 2 and 3A-E, which together illustrate calibration of the point-spread function (PSF), in accordance with some applications of the present invention.

For some applications, in order to calibrate a relation between the z-position of an emitter to the shape of its point-spread function (PSF), experimental PSFs that correspond to different z positions, were obtained as shown in FIGS. 1C-D. FIG. 1C, illustrates standard point-spread functions (PSF's), 50-1, 50-2, 50-3, 50-4, 50-5, 50-6 and 50-7 for various z positions. FIG. 1D, illustrates astigmatic (modified) point-spread functions (PSF's), 52-1, 52-2, 52-3, 52-4, 52-5, 52-6 and 52-7 for various z positions using phase-modulating element 202, in this case a long-focal length cylindrical lens, f=1 m, in accordance with some applications of the present invention. (Scalebars in FIGS. 1C-D are 1 µm).

Figure 2:
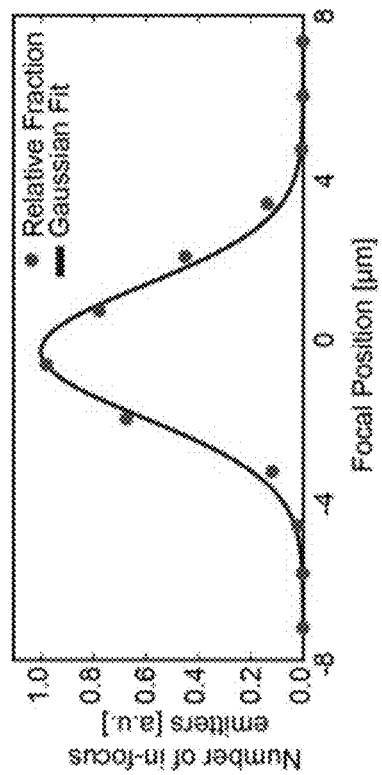
FIG. 2 is a graph showing distribution fluorescent bead positions within the core fluid in the flow cells for calibration purposes, in accordance with some applications of the present invention.

Typically, a distribution of multiple flowing fluorescent emitter calibration objects 160 (e.g., fluorescent microspheres (100 nm fluoropheres, Invitrogen)) is measured. To this end, the fluorescent microspheres (or beads) are imaged at multiple different positions in the core fluid and the distribution of the fluorescent microspheres is measured. As described herein, the position of any given fluorescent microspheres in flow has the potential to be in any number of positions within the core fluid (FIG. 1). The core fluid that contains the fluorescent objects is microns thick (e.g., ~7 µm in these experiments), and as shown in FIG. 2, the probability distribution of the positions of the fluorescent microspheres is generally Gaussian. Additionally, the positions of the fluorescent microspheres are independent of the focal position of imaging objective 100.

The multiple images are collected and fitted, as shown in FIGS. 3A and 3B respectively. FIG. 3A, is an image representative of a single fluorescent emitter, and FIG. 3B is a model-function fit of the image data.

In accordance with some applications of the present invention, one hundred thousand images were collected with flow cytometer 240 at a range of objective defocus positions (e.g., ±1.6 µm in 0.8 µm intervals) and exported using the AMNIS IDEAS software (EMD Millipore) as .cif files which could then be analyzed using the Bio-Formats software package and an open-source, flow-cytometry image-loading script implemented in Matlab (Mathworks). For astigmatic-PSF analysis (e.g., for cases in which phase-modulating element 202 is a cylindrical lens), each image was fit to a 2D asymmetric Gaussian that contained an offset to account for background (Eq. 1) using the trust-region-reflective non-linear least squares algorithm. The mathematical description of the PSF is given by:

$$PSF(x, y) = a \cdot e^{-\left(\frac{(x-x_0)^2}{2\sigma_x^2} + \frac{(y-y_0)^2}{2\sigma_y^2}\right)} + b(x, y),$$

where a corresponds to the amplitude of the PSF, $(x_0, y_0)$ is the center of the Gaussian, $(\sigma_x, \sigma_y)$ denote the shape parameters in the x and y directions, and b corresponds to a background term originating from environmental noise or cellular fluorescence when applicable. For applications in which phase-modulating element 202 comprises a phase-mask, e.g., a Tetrapod phase-mask, an alignment of the shape parameter can be performed similarly to that of the cylindrical lens, except the image is fit by a model function using maximum-likelihood-estimation. It is noted that the mathematical description of the PSF may be calculated also as describe herein in the METHODS, as appropriate.

In accordance with some applications of the present invention, following the collecting and fitting of the images as described hereinabove, the set of recorded images is analyzed to find the distribution of shape parameters at various objective positions, as shown in FIG. 3C which is a 2D histogram of the observed vertical and horizontal shape parameters at various objective positions (focuses) 100-1 (relative focus 1.6), 100-2 (relative focus 0.8), 100-3 (relative focus 0.0) and 100-4 (relative focus −0.8). Changes in the distribution of observed shapes at the various focal positions are measured to characterize the change in the shape distribution (Eq. 1) at the range of microscope objective positions. The inventors note that there were subtle changes observable in the point-spread function (PSF) at different focal positions, however, the effect was small.

Reference is now made to FIG. 3D which illustrates the shape parameters along the cumulatively measured positions. Typically, following analysis of the images, the point-spread function PSF of the microscope of the imaging flow cytometer is calibrated. Typically, to that end, the shape parameters are compared versus the expected particle distribution maps the defocus behavior onto the range of emitter positions (as shown in FIG. 3D). By comparing the shape parameters at the same position in the channel, i.e. the same percentile of the flowing objects, calibration points are obtained and then interpolated.

The result is a calibration curve for each of the two shape parameters, relating the z position of a point source to the measured PSF, as shown in FIG. 3E (shown as Vertical curve 501, and Horizontal curve 502). In other words, any measured PSF can be mapped onto a z coordinate as shown in FIG. 3E. More precisely, the z coordinate represents the change in objective position required to bring an emitter into focus.

As described hereinabove, examples of emitters found to be at various z positions are shown in FIG. 1D. It is noted that it was also possible to perform the calibration process with the standard PSF (FIG. 1C), however it typically requires positioning the objective far to one side of the distribution of emitters such that they only appear defocused on one side of the focal plane to avoid redundant shape parameters.

In summary, by analyzing many images of calibration objects 160, (fluorescent beads), in flow (FIG. 3A-B) and measuring the change in distribution of observed shapes at various focal positions (FIG. 3C), the point-spread function (PSF) of the microscope of the imaging flow cytometer is calibrated (FIG. 3D), yielding a calibration curve for mapping any measured PSF. Thus, apparatus 200 is calibrated for providing enhanced three-dimensional information of a fluorescently-labeled sample object 150, in accordance with some applications of the present invention.

Figure 4B:
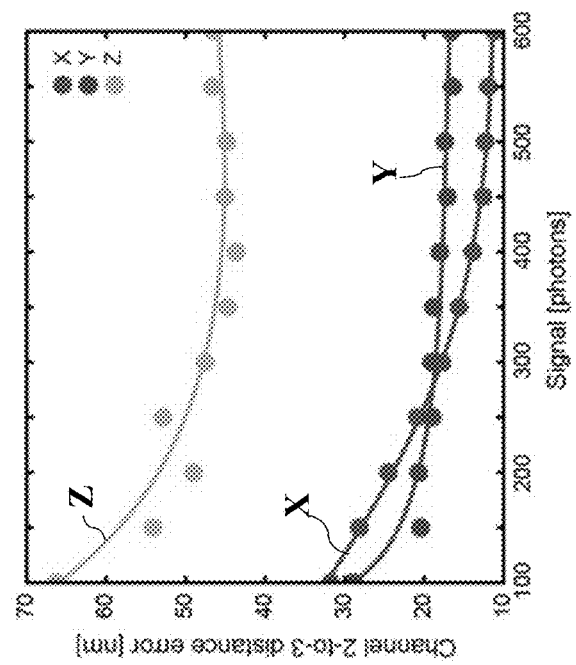
FIGS. 4A-B illustrate multichannel imaging sub-pixel registration, in accordance with some applications of the present invention.
Figure 4A:
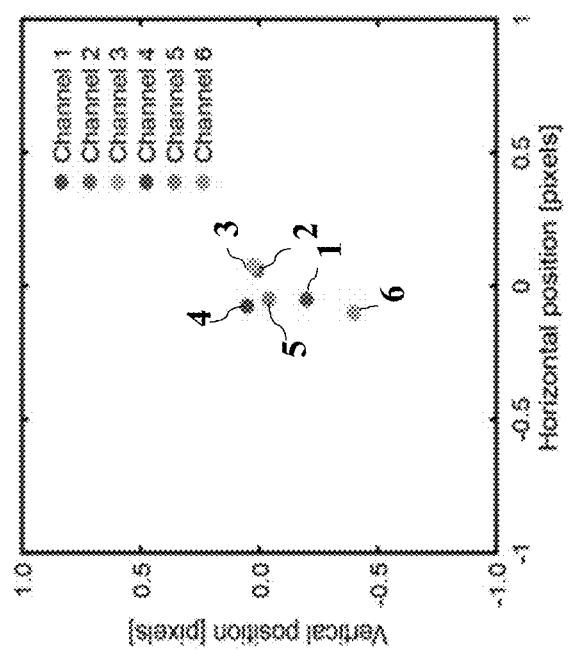

Reference is now made to FIGS. 4A-B, which illustrate multichannel imaging sub-pixel registration, in accordance with some applications of the present invention. Typically, multichannel imaging sub-pixel registration is done by correlating imaged fluorescent objects that appeared in multiple channels. FIGS. 4A-B show inter-channel alignment and precision, with FIG. 4A illustrating sub-pixel alignment of imaging channels, achieved by comparing the localization of emitters visible in all channels (N=5000), and FIG. 4B illustrating precision that is defined as the standard deviation of the measured distances between particles visible in two channels (represented by dots in FIG. 4B). As shown, FIG. 4B additionally shows a trend-line.

In accordance with some applications of the present invention, using the broad emission spectrum of fluorescent beads (for example, Tetraspeck fluorescent beads from Life Technologies), the same objects (i.e., fluorescent beads) were imaged in six color channels simultaneously. The resulting six images were then averaged and fit with an asymmetric Gaussian to provide the initial parameters to fit each image separately. The mean shifts relative to the mean image were all less than 1 pixel, fine-tuning the default multicolor image registration provided by the imaging flow cytometer instrument software (as shown in FIG. 4A). In order to estimate the relative-distance error, Tetraspeck beads were localized in multiple channels, applied the average registration and measured the distribution of residual displacements in all three dimensions. Since the precision to which emitters (i.e., fluorescent beads) can be localized is determined by their fluorescent signal, beads were binned by brightness to measure the error for various conditions (as shown in FIG. 4B). The error in z (depth in the channel) was slightly worse than that of x and y. While the measured precision generally improved with brightness, non-signal level related precision factors likely play a role in the maximum precision achievable, e.g. channel registration error, which were found to be ~(13, 21) nm in (x,y) using 1000 bright objects.

Reference is now made to FIGS. 5A-C and 6A-D which illustrate cell image analysis and three-dimensional co-localization of fluorescently labeled DNA loci, obtained using apparatus and methods in accordance with some applications of the present invention. In general, applicability of apparatus 200 and the methods described herein with reference to FIGS. 1A-4B, is demonstrated in FIGS. 5A-C and 6A-D. More specifically, the co-localization experiments shown in FIGS. 5A-C and 6A-D were performed using an astigmatic point-spread function (PSF), produced by a phase-modulating element 202 comprising a cylindrical lens placed in the fluorescence emission path (as shown hereinabove with reference to FIG. 1A).

The data shown in FIGS. 5A-C and 6A-D was obtained from fluorescently labeled live yeast cells. For the live cell experiments of budding yeast containing two fluorescent loci shown in FIGS. 5A-C and 6A-D, KW4069 cells (courtesy of Prof Karsten Weis, Institute of Biochemistry ETH Zurich) were inoculated and grown overnight in YEPD media at 30° C. and shaken at 200 revolutions per minute reaching the stationary growth phase. Three hours prior to experiments, cells were diluted to an OD of 0.3, and grown until reaching the logarithmic phase (OD~0.7). Next, cells were centrifuged, washed twice with filtered water, and resuspended in filtered water immediately before the experiment, to have an approximate OD of 0.07 to ensure that most images contain only a single cell.

Figure 5C:
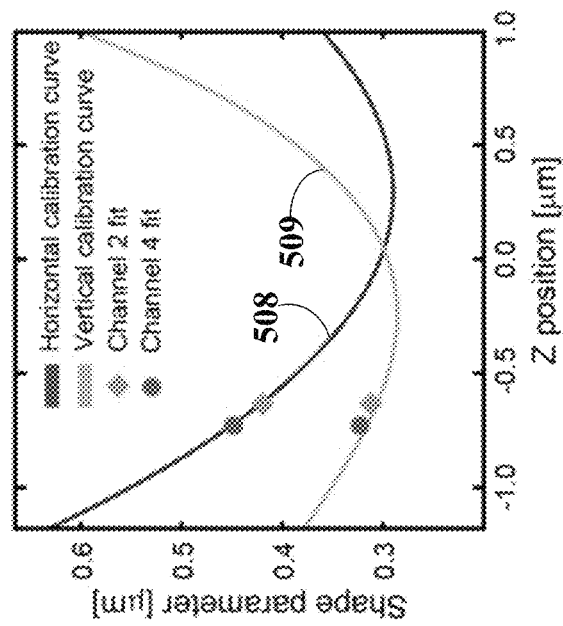
FIGS. 5A-C illustrate cell image analysis using apparatus and methods in accordance with some applications of the present invention.
Figure 5A:
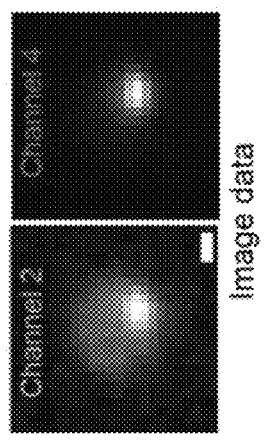
Figure 5B:
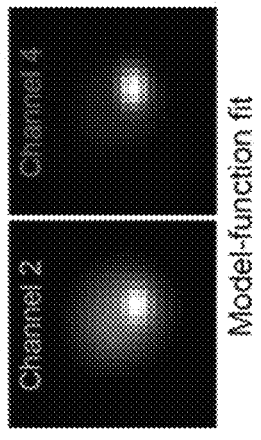

Cell images were first analyzed to ensure only a single cell was present in each image. Accordingly, FIG. 5A shows a single yeast cell imaged in two channels (Scalebar 1 μm). Image data was then fit with a 2D asymmetric Gaussian with an offset as described for the calibration bead sample, but also with a local cell-background parameter derived by convolving a threshold image with a Gaussian, as shown in the model-function fit of the image data in FIG. 5B. Finally, the localizations were registered via calibration measurements and the Z positions of the particle in each channel was found by minimizing the distance of the extracted shape parameters to the calibration curve. FIG. 5C shows calibration curves relating the two shape parameters to z positions (horizontal calibration curve 508 and vertical calibration curve 509) and the extracted shape parameters from the two channels (channel 2 fit, and channel 4 fit, as indicated in FIG. 5C). In this case the 3D distance was found to be 220 nm (123, 157, 95) nm in (x, y, z). More specifically, the distance between the points indicating channel 2 fit, and channel 4 fit in Z was found to be 95 nanometers.

FIGS. 6A-D show 3D positions of multi-colored fluorescently labeled DNA-loci inside live yeast cells, obtained in a high throughput system, in accordance with some applications of the present invention. As noted hereinabove, the experiments shown in FIGS. 6A-D were performed using an astigmatic point-spread function (PSF), produced by a phase-modulating element 202 comprising a cylindrical lens placed in the fluorescence emission path (as shown hereinabove with reference to FIG. 1A).

Figure 6A:
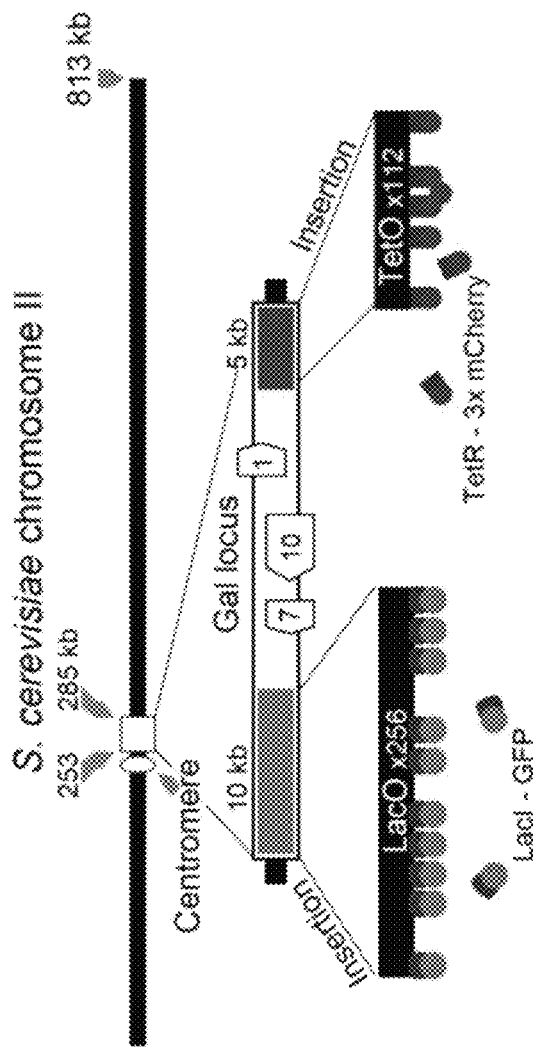
FIGS. 6A-D illustrate three-dimensional positions of DNA loci in yeast obtained using apparatus and methods in accordance with some applications of the present invention.
Figure 6B:
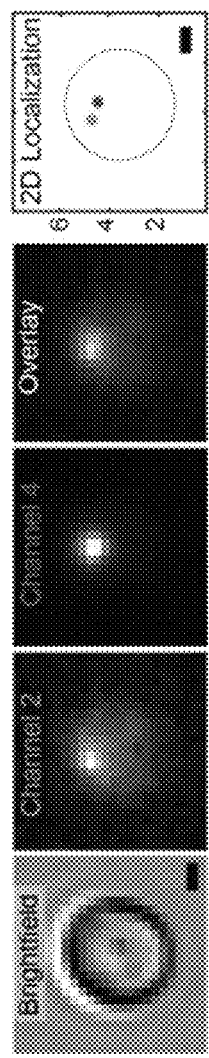
Figure 6C:
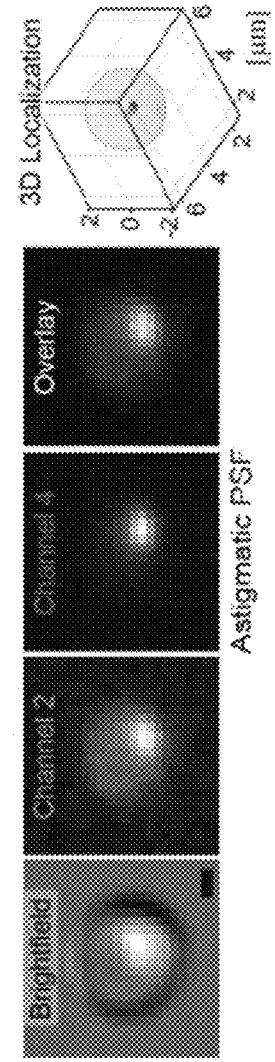
Figure 6D:
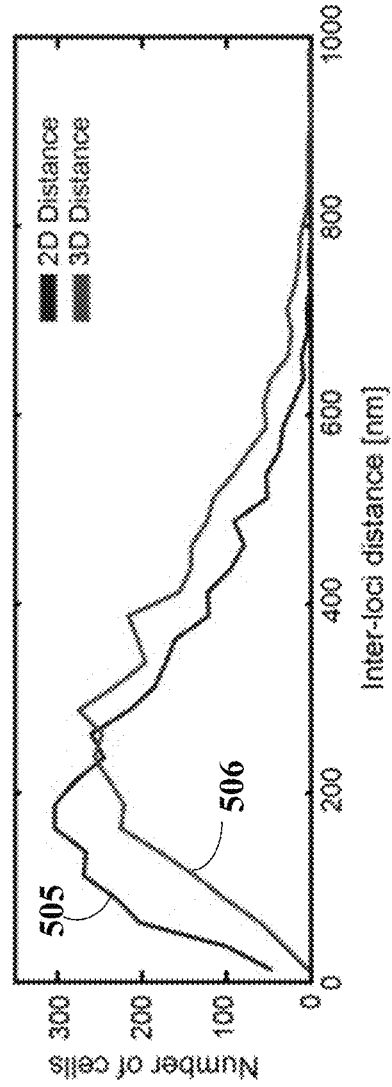

FIG. 6A, shows modification of chromosome II for Gallocus imaging, in yeast cells in order to obtain fluorescently labeled DNA-loci inside the yeast cells. FIG. 6B shows 2D data of a yeast cell with standard point-spread function (PSF). By incorporating a cylindrical lens into the optical path, as described hereinabove with reference to FIG. 1A, depth of each loci of labeled DNA is encoded, and localize in 3D (as shown for a different yeast cell in FIG. 6C, (Scalebars 1 μm)). Finally, by performing multichannel registration obtain the 3D distances between each pair of loci are obtained in 2D (line 505) and 3D (line 506) for N=5,300 cells, as shown in FIG. 6D. The precision of 3D distance determination from the measurement was ~60 nm, as estimated from beads with similar signal level.

As noted, that the data is obtained in a high throughput system, e.g., apparatus 200. For some applications, the throughput is high such that within 200 seconds 3D colocalizations from more than 5000 cells suitable for analysis, were obtained. This is typically 2 orders of magnitude faster than existing scanning-microscopy approaches.

Using the obtained cell data, it is additionally possible to evaluate the effect of index mismatch. For example, under the assumption that the cells are randomly oriented, the mean z-distance between the loci should be equal to the x and y distances. From the distance distributions along the three axes, it was found that the effect is a stretching in the z direction by a factor of 1.1, however a more accurate investigation can be performed by obtaining more data.

Figure 7:
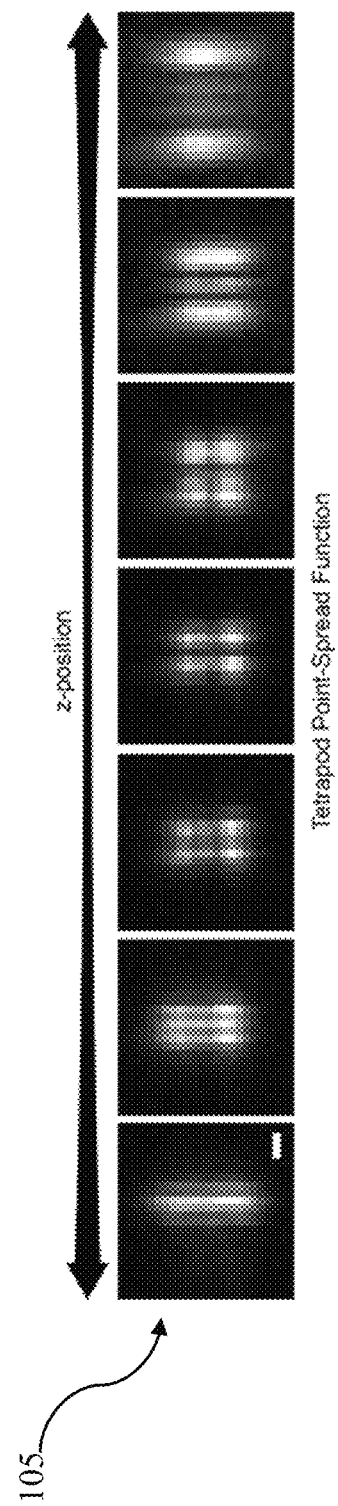
FIG. 7 illustrates cell image analysis using apparatus and methods in accordance with some applications of the present invention.

Reference is now made to FIG. 7 which illustrates cell image analysis using apparatus and methods in accordance with some applications of the present invention. For the experiments shown in FIG. 7, phase-modulating element 202 incorporated into the image flow cytometer comprises a phase-mask, e.g., a Tetrapod phase-mask as described elsewhere herein with reference to FIGS. 12A-C). Flowing calibration object (fluorescent beads) were then imaged, in accordance with some applications of the present invention. Qualitative results are shown in FIG. 7, exhibiting the encoding of bead-depth (z) in the shape of the Tetrapod PSF 105. For some applications, a Tetrapod PSF enables a large usable depth (z) range while maintaining high localization precision. This can be useful for localizing emitters (fluorescently-labeled objects) that are farther away from each other, or at larger distances from the focal plane, further increasing yield.

Reference is now made to FIGS. 8A-12C, which provide additional experimental results further demonstrating applicability of apparatus 200 and methods for use thereof, in accordance with some applications of the present invention. More specifically, FIGS. 8A-E, FIGS. 9A-H and FIGS. 12A-C, illustrate the imaging system 200 (comprising imaging flow cytometer 240) and calibration of the point-spread function (PSF), in accordance with some applications of the present invention. FIGS. 10A-F and 11A-E demonstrate applicability of the apparatus and method describe herein by obtaining large data sets of relative 3D positions of fluorescently-labeled DNA in vitro by imaging DNA-origami nano-rulers (FIGS. 10A-F), and in vivo by measuring chromosomal compaction states inside live yeast cells (FIGS. 11A-E).

Reference is first made to 8A-8E, which illustrate 3D microscopy in an imaging flow cytometer (IFC). As described hereinabove with reference to FIG. 1A, a phase modulating element 202 is introduced into optical imaging path 300 of an imaging flow cytometer 240. For some application, as now shown in FIGS. 8A-B, the optical phase modulating element comprises an optical element such as cylindrical lens 1202. Cylindrical lens 1202 is arranged in the optical path of the imaging flow cytometer. In accordance with some applications of the present invention, FIG. 8B shows an Amnis ImageStream®X (ISX) multicolor IFC modified with cylindrical lens 1202, employed in some of the experiments described herein. The Amnis ImageStream®X (ISX) multicolor IFC typically has an optical emission path that is accessible and has space for placing additional optics, e.g., cylindrical lens 1202.

FIG. 8A further shows fluorescent objects 150 and 160 moving through a microfluidic device pass and are recorded by a high-speed camera 500. FIG. 8C is a graph illustrating object 150 having distributed approximately a normal depth distribution. FIG. 8D shows images of objects at various defocuses imaged in 2D mode, and FIG. 8E shows, images of objects at various defocuses imaged with the imaging system comprising cylindrical lens 1202 incorporated into the imaging path.

Reference is now made to FIGS. 8F, and 9A-H which illustrate PDF-based 3D localization calibration, in accordance with some applications of the present invention.

In a microfluidic device (e.g., in an imaging flow cytometry instrument), there are two major limitations that necessitate the development of a new calibration method for 3D localization. First, objects are passed by the imaging region too quickly to effectively scan their positions to create a 3D calibration curve, and second, the specific depth (i.e. z position) of any given object in the flow chamber is not deterministic and stems from the microfluidics-governed probability distribution function (FIG. 8C).

Therefore, in accordance with some applications of the present invention, the high-throughput nature of flow cytometry is relied on to gather a large dataset that well samples the underlying probability distribution of depths of the objects. By ordering the images relative to one another without a priori knowledge of the true depth positions, the statistically most-likely positions of a set of images is mapped to their extracted parameters, thus yielding a calibration curve that can be applied to new images. The requirements of this approach are that 1) the images can be reasonably ordered by relative depth, and 2) the imaged objects sample a known depth distribution.

FIGS. 9A-H illustrate depth (Z) calibration and color registration for the modified (astigmatic) point-spread function (PSF) implemented with cylindrical lens 1202.

FIG. 9A shows the emission spectrum of multicolor fluorescent beads (TetraSpeck™) overlaying the collection windows of the six-color channel imaging flow cytometer (ImageStream®X). FIG. 9B is a set of images obtained for an individual fluorescent bead imaged in six color channels. FIG. 9C shows the extraction of the angle and shape parameters from one such image shown in FIG. 9B (left) and a 2D histogram of the entire dataset recorded over 5 minutes plotted on a log 10 scale for one color channel (right). In FIG. 9D the same dataset was then used to assign a relative depth position to each image, and FIG. 9E shows mapping to a depth position based on relative probability of finding emitters at each z position. In FIG. 9F the images were re-fit to directly find the z positions. FIG. 9G shows relative localized positions after performing a color correction, and FIG. 9H is representative of the 3D cross-channel error computed by measuring the mean geometric distance in 3D.

Reference is still made to FIGS. 8F and 9A-H. In order to calibrate the emitter-depth distribution in the imaging flow cytometer (ImageStream®X), first an image library of fluorescent beads at different objective focuses was acquired, and then the data was fit with a 2D symmetric Gaussian and the fraction of infocus beads at each given position was calculated (i.e. the fraction with a small PSF shape, as described hereinabove with reference to METHODS). It was found that the distribution closely matched the manufacturer's settable "core size" parameter, which corresponds to the range containing 96% of objects, 2 standard deviations from the mean (shown in FIG. 8F which is measured depth distribution of calibration object beads at two core-size settings. The fraction of in-focus beads was calculated for a range of objective focus positions (represented by the bars) and fitting the result with a 1D Gaussian (represented by the line) to extract the distribution width, reported as 4× standard deviation).

Next, a cylindrical lens was inserted into the instrument between two of the relay lenses, and a dataset containing 50K multicolor fluorescent beads (FIG. 9A) was collected over ~5 minutes in six color channels simultaneously (an example set of images for one bead is shown in FIG. 9B). Each image was then fit with a freely rotating, asymmetric 2D Gaussian function to extract the amplitude, A, angle, θ, two Gaussian size parameters σx and σy, in addition to a constant offset term, b (FIG. 9C, left). Images of objects showing a clear astigmatism were used to identify the orientation angle of the lens. Interestingly, a slight difference was found in the preferred angle above and below the focal plane. The data was next re-fit to an asymmetric 2D Gaussian at these identified angles (FIG. 9C, right). The shape parameters σx and σy were used to define a relative depth order which was parameterized as χ extending from 0-100 [A.U.] (FIG. 9D). The cumulative fraction of objects measured in terms of χ were then compared to the statistically-expected cumulative distribution function (CDF) to create a calibration curve (FIG. 9E). The dataset was then re-fit to extract the x, y, and z positions in each image for all six color channels (FIG. 9F). By comparing the extracted positions in any given image to the average position obtained for all six images, a color-registration correction for colocalization across channels, was calculated. It is note that due to chromatic and field-dependent aberrations as well as limited SNR in the images, the expected 3D distance measurement between simultaneously acquired images of the same bead is not zero but is centered around zero in each axis (FIGS. 9G and 9H).

Reference is now made to FIGS. 10A-F and 10J, which illustrate imaging of fluorescent nanorulers by 3D imaging flow cytometry (IFC), in accordance with some applications of the present invention.

Experiments described with reference to FIGS. 10A-F were done to extract specific distances between emitters (as opposed to 3D-distance measurements performed on images of the same object (fluorescent beads)), using apparatus and methods, in accordance with some applications of the present invention. In accordance with some applications of the present invention, the nanorules are used in the imaging flow cytometry as a calibration for 3D distances. First, in silico measurements were performed to examine the effect of localization precision on 3D distance measurements and determined that under normal conditions (a localization precision of 25 nm in each axis per image, which corresponds to a ~55 nm cross-channel 3D error), two objects separated by ≥160 nm would be measured with an average bias of <5%, relative to the true distance. Objects separated by a smaller distance will exhibit a relatively-larger separation on average compared to the true separation (shown in FIG. 10J which is simulated 3D distance measurements with localization error. Simulations of localized 3D positions were simulated for random objects with various separation distances (0 and 180 nm objects indicated by two asterisks and one asterisk, respectively). The measured 3D displacement increases with worsening localization error).

To compare to a known reference sample, a commercially available, DNA-origami, fluorescent nanoruler was employed, whose length of 180 nm was specifically encoded into the DNA sequences used for assembly (as described hereinabove with reference to METHODS). Each side of the nanoruler contained a cluster of fluorescent molecules that were blue (Atto488) and red (Atto647N), respectively (as shown in FIG. 10A which is a cartoon depiction of a nanoruler 1102 with two fluorescently labeled ends).

The sample was diluted and mixed with fluorescent beads prior to imaging in the imaging flow cytometer (ImageStream®X), in accordance with some applications of the present invention. A subset of fluorescent beads was used for calibration, and the remainder were compared to the results of nanorulers 1102. It is note that the two species were readily distinguishable by their spectra (as shown in FIGS. 9A and 10B which is the fluorescence spectrum of the utilized nanoruler), and therefore the identity of each object could be easily determined by comparing the relative image intensities between channels 2, 4, and 5 (FIGS. 9B, and 10C which shows fluorescent images recorded in the imaging flow cytometer recorded in the 2nd and 5th color channels). Channels 2 and 5 were analyzed to find the 3D positions of emitters (as shown in FIG. 10D which shows the raw positions extracted for objects for the two-color channels). The calculated inter-channel distances in each axis (as shown in FIG. 10E which shows the measured inter-channel distances) were used to compute the geometric 3D distance for each object, i.e. the object length (shown in the 3D length measurement presented in FIG. 10F), and were comparable to the analogous measured lengths by conventional 2D LM for the nanorods, with a mean±standard deviation of 171±90 nm for the IFC and 152±53 nm by standard microscopy, respectively. 2D measurements of DNA nanorulers calibration objects are shown in FIGS. 10G-I. FIG. 10G shows fluorescent images recorded in the imaging flow cytometer recorded for red, blue channels, and their overlay, respectively. FIG. 10H is a close-up view showing the co-localization of the two colors, and FIG. 10I shows length measurements for fluorescent beads (represented by numeral 160-4) and nanorulers (represented by numeral 160-2).

Reference is now made to FIGS. 11A-G, which illustrate 3D high-throughput imaging of live yeast, in accordance with some applications of the present invention.

Fluorescently-tagged DNA loci of live yeast cells were imaged to investigate a proposed mechanism for gene regulation, whereby the chromosome of inactive regions of genes is compacted, presumably to sequester expression. DNA regions designed to bind fluorescently-labeled proteins were encoded in two regions flanking the Gal locus, a group of genes responsible for metabolizing galactose as described previously (FIG. 11A). In the presence of preferred sugars, the 3D distance is smaller as the cell sequesters the galactose-metabolizing genes (FIG. 11B). In galactose-growing conditions, the chromosome locally unfolds (FIG. 11C), leading to greater interloci distances. Cells were grown for three hours in either dextrose or galactose-containing media, which was replaced with water containing fluorescent beads prior to imaging by IFC (as described hereinabove with reference to METHODS).

Figure 11G:
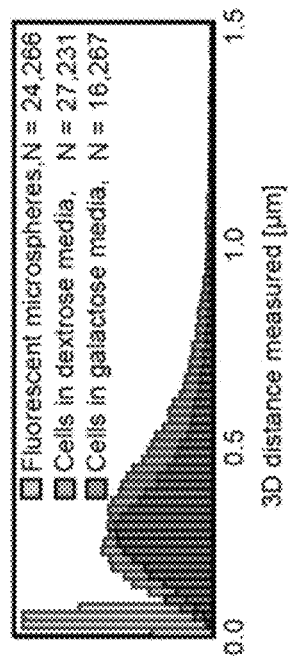
Figure 11F:
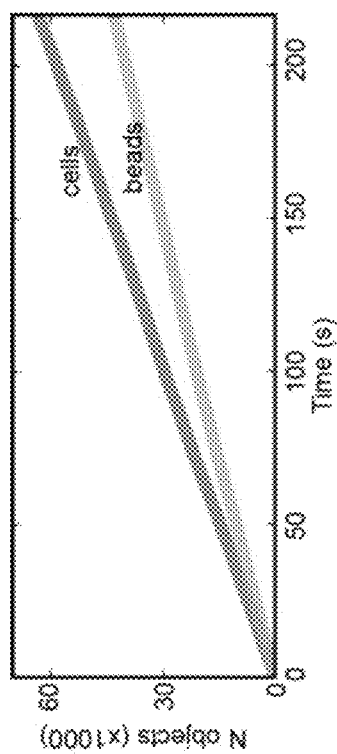

Unlike fluorescent beads and nanorods, where the background image intensity could be accounted for by a constant offset term, yeast have a spatially-varying fluorescent background stemming from unbound fluorescent probes and cellular autofluorescence (FIG. 11D). Therefore, a modified version of the fitting algorithm was used where a spatially variant, cell-background shape was first estimated, and then a second background amplitude parameter, corresponding to the cell background, was fit in addition to the constant image background and PSF parameters (as described hereinabove with reference to METHODS). Generally, no abnormalities could be detected by brightfield imaging, conducted in channel 6 (FIG. 11E), however, it was normally turned off during imaging to minimize background. Image channels 2 and 4 (FIG. 11D), which best correspond to the GFP and mCherry fluorescent proteins were analyzed to extract the 3D positions (FIG. 11G. The mean interloci distance may be dependent on the growth condition, however, while previous datasets were recorded over hours at ~1 image per second 30, the methods provided herein in accordance with some applications of the present invention, in which imaging at hundreds of images per second is done, produced a much larger library of cell images in only a few minutes (FIG. 11F).

Figures 12A, 12B, 12C:
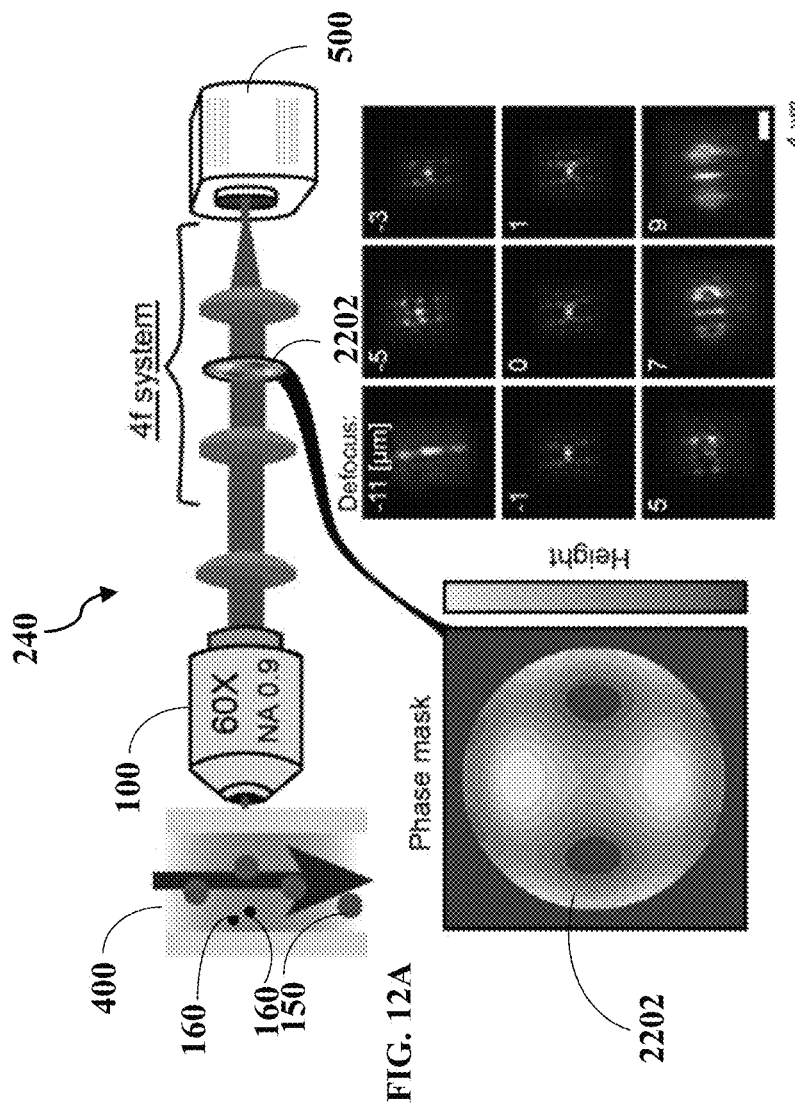
FIGS. 12A-C illustrate an extended depth range obtained with the Tetrapod PSF, in accordance with some applications of the present invention.

Reference is now made to FIGS. 12A-C, which illustrate an extended depth range obtained with a Tetrapod PSF, in accordance with some applications of the present invention. For some applications, phase-phase-modulating element 202 which is introduced into imaging flow cytometer 240 comprises a phase-mask, e.g., a Tetrapod phase mask 2202.

FIG. 12A is a schematic illustration of imaging cytometer 240 modified with the addition of a phase-mask in the back focal plane of the imaging path. Unlike cylindrical lens 1202, Tetrapod phase mask 2202 is implemented in the back focal plane (BFP) of the microscope of imaging flow cytometer 240. Therefore, a phase-mask holder was designed to properly insert a Tetrapod phase mask into the BFP of imaging flow cytometer 240 (ImageStream®X), in accordance with some applications of the present invention.

FIG. 12B is a schematic illustration of a blown-up view depicting tetrapod phase mask 2202, in accordance with some applications of the present invention.

Typically, use of tetrapod phase mask 2202 provides an apparent increased depth-range of the microscope, and the core size could be increased significantly, thereby enabling much faster flow rates. Similar to cylindrical lens 1202, the key step is to define a relative order of the images to map onto the flow-determined CDF. This was done by narrowing the core size and scanning the objective over a 20 μm range in 1 μm steps. At each focus, 250 images were recorded and aligned to produce a high-quality, average PSF (FIG. 12C). Subsequently acquired images with the large core were then ordered using an interpolation of this average-PSF library and a new calibration curve could be generated.

It is noted that, in accordance with some applications of the present invention, customized phase-masks design are utilized to make optimal use of the Z-range needed for a particular experiment, and make the z determination more robust to variations in flowrates, e.g. by encoding the depth in a PSF stretch in one direction, orthogonal to the flow direction. PSF engineering could also be used to enhance the autofocusing and core-size characterization by applying PSF engineering to a dedicated imaging channel inside an instrument. Finally, in addition to making use of only two spectral channels to characterize a single distance within a sample, utilizing all of the windows of the device would enable multiple distance measurements simultaneously. Furthermore, incorporating fluorescence-activated cell sorting (FACS) based on sub-cellular colocalizations by incorporating online analysis and classification of cells into the IFC operating software, which provides intriguing possibilities for new types of selection-marker technologies.

Reference is now made to the methods described herein with reference to FIGS. 1A-12C. The following description further elaborates on methods described herein and practiced in combination with the system and apparatus described herein with reference to FIGS. 1A-12C.

In accordance with some applications of the present invention, it is determined how the point-spread function (PSF) of an imaging system (e.g. an imaging flow cytometer or a microscope) changes with respect to a variable (e.g. Z-position (depth) and/or color), in situations where the variable value is unknown in each individual measurement, but two recorded images can be compared to determine which has the higher value.

Typically, this is useful in situations, as in imaging flow cytometry, where it is not possible to obtain a PSF dictionary by measuring one object (or several objects) multiple times while changing or tuning the variable (e.g. measuring the PSF response to defocus by imaging a particular object then defocusing by a known amount and imaging again, as is common in localization microscopy.

In accordance with some applications of the present invention, the following steps are performed. For clarity, we describe the following steps for depth, although a similar approach could be used for another variable, e.g. color for determining the number of subunits in a macromolecule.

(a) First, a probability-distribution function (PDF) of events with respect to the unknown variable is obtained by calculation or measurement. The ensemble Z-position probability profile was measured by counting the relative fraction of in-focus objects at different focal planes (as shown in FIG. 2), differentiating an in-focus object from an out-of-focus object (in either direction) by the size of the PSF. The result is a measurement that represents the likelihood of any new object being at a particular depth, that is the probability distribution function (FIG. 2).

(b) Next, PSF is modulated using phase-modulating element 202 (e.g. cylindrical lens 1202 shown in FIG. 8A-B, and tetrapod-phase mask 2202 shown in FIG. 12A-B). It is noted that the order of steps (a) and (b) are interchangeable.

Furthermore, determining the PDF of step (a) can be performed at any time as late as step (d) described below.

(c) Next, a sufficient number of images containing individual objects is obtained so that the set of images well-samples the PDF (FIG. 9B-C).

(d). Next, individual objects are ordered according to their relative positions in Z (or whichever variable is being determined). It was identified by the inventors that this step is not easily accomplished in an imaging flow cytometer or microscope without PSF engineering because the standard PSFs typically varies only slightly (and/or redundantly) as the underlying parameters are changed, however, with PSF engineering, this relative-ordering step is facilitated by intentionally making these changes more obvious as changes in the shape of the PSF (FIG. 9D). This step creates a relative position order based on the shape of the modified PSF. This can be accomplished in one of the following ways or other variations of the points below, in accordance with some applications of the present invention:

I. A mathematical model function to describe the image intensity distribution seen in the image (what the image looks like). This function takes into account variables that, when changed, will change the shape of the function, as shown in the Asymmetric Gaussian model function demonstration with the Astigmatic PSF induced by a cylindrical lens (FIG. 9C).

II. An alternative approach is ranking images assigning a number according to the image order. For large numbers of images, only a subset of images needs to be ranked then further images are ranked automatically by similarity to the previously ranked images. This is the user-selected template matching approach. This approach is demonstrated in FIGS. 12A-C showing Tetrapod PSF modulation.

III. Maximum-likelihood estimation could be used to match the underlying variables of each image to a computational model of the approximate imaging system. This computational model is then refined based on the results of steps (d)-(f).

IV. A template of images could be obtained on a similar imaging system where scanning is permissible, and then applied to the imaging system. Similar to the above.

The key of steps I-IV is that there is a new variable (either relative-depth image rank, or other numerical input) changes as a function of the Z position (or another variable). In other words, the changes in the image's point spread function are describable mathematically in terms of this new variable (FIG. 9D).

i. Each value of this new variable must correspond to a unique Z position (FIG. 9E).

ii. Each Z position should correspond to a unique value in the new parameter space (FIG. 9E).

iii. A relative depth parameter value lower than another parameter value must correspond to a Z position that is lower than the Z position associated with the aforementioned higher parameter value (FIG. 9E).

(e). Next, each image is assigned a likely Z (or other variable) value according to the underlying probability distribution function. For example, if 100 images were acquired the image ranked 50th according to its parameter should correspond to the Z position in which the cumulative distribution function (CDF) is at 50%, that is, the center of the flow probability distribution function.

(f). Next, these depth assignments are used to create a calibration curve. For some applications, the features extractable from the lowest ranked image among N images corresponds to the feature values that would be seen from an object with variable value equal to the most likely value for the first of N acquired images. Optionally, the calibration curve can be improved by accounting for imperfect ordering error and the stochastic nature of randomly imaging a discrete number of objects coming from a probability distribution. For continuously changing variables (e.g. the depth position of an object in a microfluidic device), this is done by smoothing the calibration curve.

(g). Finally, the calibration obtained in steps (a)-(f) for calibration objects (e.g., calibration object 160) is applied by measuring the features of an object (e.g., a sample object 150) in a new image and then comparing the results with the previously described calibration curve in order to extract the most likely variable value. This can be done with excellent precision because the calibration curve can be interpolated.

It is noted that, steps (d)-(g) can be done via analysis performed following the calibration experiment. Additionally, or alternatively, the above process can also be performed during a measurement using a rolling window of objects such that the condition of sampling the PDF is met and that there is sufficiently fast image analysis. It is further noted that analysis steps described in steps (d)-(g) can be performed by processor 700, and/or by a computer program product for administering processing of a body of data, the product including a computer-readable medium having program instructions embodied therein, which instructions, when read by a computer (or processor 700), cause the computer to perform steps (d)-(g).

It is additionally noted that implementation of PSF engineering as described herein in accordance with some applications of the present invention, facilitates rendering step (d) readily accomplishable. In the absence of PSF engineering, it may be difficult to order the objects unless they are very far apart and unusually large SNR. If those two conditions do exist, then PSF engineering may not be used, however, the calibration method described herein is still applicable and useful to achieve the relative image ordering.

Reference is again made to FIGS. 1A-12C, and to apparatus and methods of use and calibration thereof as described herein.

As noted elsewhere herein, in a microfluidic device as used in imaging flow cytometry, there are two major limitations that necessitate the development of a new calibration method for 3D localization. First, objects are passed by the imaging region too quickly to effectively scan their positions to create a 3D calibration curve (FIG. 8A); and second, the specific depth (i.e. z position) of any given object in the flow chamber is not deterministic and stems from the microfluidics-governed probability distribution function (PDF, FIG. 8C). It is noted that, the methods for calibration described herein (e.g., with reference to FIGS. 1A-3E and 9A-H), are generally broadly applicable as they rely on, a) being able to sort images relative to one another, and does not require a detailed numerical model, and b) measuring or having a priori knowledge of the underlying distribution of objects imaged, whether it be Gaussian, uniform, or otherwise distributed in the sample.

Nevertheless, it is noted that other techniques for depth calibration may be utilized in accordance with some applications of the present invention. For example, creating a numerical model of an imaging system and using it for extracting 3D positions of an object, for determining localization. Additionally, or alternatively, another possible approach is physically switching between a fixed sample and a flowing sample or temporarily fixing (immobilize) fluorescent objects within the flow cell in order to calibrate the PSF. This could be done using an orthogonal means to immobilize objects and then scan the PSF by changing the objective position or moving the object itself, e.g. force spectroscopy techniques, such as magnetic and optical tweezers, to hold and position an object in 3D. Yet another approach is temporally fixing an emitter in 3D by reversibly polymerizing the fluid in the device to temporarily halt movement within the flow and collect a 3D scan.

Reference is again made to FIGS. 1A-12C, and to apparatus and methods of use and calibration thereof as described herein. In addition to new applications directly related to IFC, the methods for calibration of an imaging system described herein may be used to calibrate any microscope's 3D PSF, by temporally installing a flow system with well-known depth-distributed properties to first produce a calibration curve that could be applied to static samples. This approach would solve the longstanding problem caused when a calibration curve is generated with surface-adhered objects, yet imaging is performed into a media with a different refractive index.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for calibrating a point-spread function (PSF) of a microscope, comprising:
   (a) introducing a plurality of calibration objects having a known depth distribution into a flow imaging system, such that there is relative movement between the calibration objects and the flow imaging system;
   (b) modifying, using a phase-modulating element arranged with optics in an imaging path of said flow imaging system, light emitted from the calibration objects by modifying the light passing along the imaging path to create a modified PSF;
   (c) capturing a plurality of images of the calibration objects at multiple different positions of the calibration objects;
   (d) generating a calibration curve by decoding the PSF for the calibration objects; and
   (e) capturing an image of sample objects while there is relative movement between the sample objects and the flow imaging system and obtaining 3D positions of the sample objects, by applying the generated calibration curve to the image of the sample objects.

2. The method according to claim 1, wherein said introducing comprises introducing the plurality of calibration objects along with the sample objects.

3. The method according to claim 1, wherein said generating of the calibration curve by decoding the PSF for the calibration objects comprises the steps of (i) determining a probability distribution function (PDF) of the calibration objects, (ii) creating a relative position order based on the shape of the modified PSF of the calibration objects, (iii) assigning a depth to each of the plurality of images of the calibration samples, according to the determined probability distribution function (PDF, and (iv) generating the calibration curve based on the assigned depth for the calibration objects.

4. The method according to claim 1, wherein said applying of the calibration curve comprises comparing the sample objects to the calibration curve to extract a depth-based characteristic of the sample objects.

5. An apparatus comprising an imaging flow cytometer adapted to provide depth-based characteristics of sample objects while there is relative movement between the sample objects and the imaging flow cytometer, the apparatus comprising:
  (a) a flow cell chamber into which the sample objects are introduced along with a plurality of calibration objects while there is relative movement between the sample objects, the calibrations objects, and the flow cell chamber;
  (b) optics configured to pass light from the sample objects and from the calibration objects along an imaging path to an imaging plane;
  (c) a phase-modulating element configured and arranged with the optics in the imaging path, to modify light emitted from the sample objects and calibration objects, by modifying the light passing along the imaging path to create a modified point-spread function (PSF);
  (d) a processor configured to calibrate the modified PSF based on decoding the PSF for the calibration objects, and to generate a three-dimensional image of the sample objects, based on the calibration of the modified PSF.

6. The apparatus according to claim 5, wherein the phase-modulating element comprises a cylindrical lens.

7. The apparatus according to claim 5, wherein the phase-modulating element comprises a phase-mask.

8. The apparatus according to claim 7, wherein the phase mask comprises a Tetrapod phase mask.

9. The apparatus according to claim 5, wherein the processor is configured to generate the three-dimensional image by inferring depth of portions of the sample objects based upon a tetrapod point spread function PSF.

10. The apparatus according to claim 5, wherein the processor is configured to generate the three-dimensional image by inferring depth of portions of the sample objects based upon an astigmatic PSF.

11. The apparatus according to claim 5, wherein the processor comprises imaging circuitry at the image plane and configured and arranged to detect light at or incident upon the imaging circuitry to generate image data.

12. The apparatus according to claim 5, wherein the sample objects comprise a plurality of objects, and wherein the processor is configured to generate the three-dimensional image indicative of respective depths of the plurality of objects that are co-localized between different color channels of the imaging flow cytometer.

13. A computer program product comprising a non-transitory computer-readable storage medium having program code embodied therewith, the program code executable by at least one hardware processor to:
  receive a plurality of images of calibration objects at multiple different positions within a flow imaging system,
    wherein there is relative movement between the calibration objects and the flow imaging system,
    wherein said calibration objects have a known depth distribution within said flow imaging system, and
    wherein light emitted from the calibration objects is modified, using a phase-modulating element arranged with optics in an imaging path of said flow imaging system, by modifying the light passing along the imaging path to create a modified PSF;
  generate a calibration curve by decoding the PSF for the calibration objects; and
  obtain 3D positions of sample objects within said flow imaging system, based on a received image of said sample objects, by applying the generated calibration curve to the image of the sample objects, wherein there is relative movement between the sample objects and the flow imaging system.

14. The computer program product according to claim 13, wherein said plurality of calibration objects are introduced into said flow imaging system along with the sample objects.

15. The computer program product according to claim 13, wherein said program instructions are further executable to generate said calibration curve by (i) determining a probability distribution function (PDF) of the calibration objects, (ii) creating a relative position order based on the shape of the modified PSF of the calibration objects, (iii) assigning a depth to each of the plurality of images of the calibration samples, according to the determined PDF, and (iv) generating the calibration curve based on the assigned depth for the calibration objects.

16. The computer program product according to claim 13, wherein said program instructions are further executable to apply the calibration curve to the image of the sample objects, by comparing the sample objects to the calibration curve to extract a depth-based characteristic of the sample objects.

* * * * *